United States Patent [19]
Katayama et al.

[11] Patent Number: 5,905,579
[45] Date of Patent: *May 18, 1999

[54] IMAGE PROCESSING METHOD AND APPARATUS WHICH SEPARATES AN INPUT IMAGE INTO CHARACTER AND NON-CHARACTER AREAS

[76] Inventors: Akihiro Katayama; Yoshihiro Ishida, both of c/o Canon Kabushiki Kaisha, 30-2, Shimomaruko 3-chome, Ohta-ku, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/857,903

[22] Filed: May 16, 1997

Related U.S. Application Data

[63] Continuation of application No. 08/183,440, Jan. 19, 1994, abandoned.

[30] Foreign Application Priority Data

Jan. 22, 1993 [JP] Japan ................................. 5-009249

[51] Int. Cl.[6] ................ G06K 9/40; H04N 1/38
[52] U.S. Cl. .................... 358/296; 358/464; 358/538; 382/194; 382/266
[58] Field of Search .................... 358/296, 298, 358/426, 433, 443, 447, 448, 462, 464, 530, 538, 539; 382/171, 174, 176, 181, 182, 190, 192, 194, 198–200, 204, 205, 232–237, 239, 247, 250, 251, 254, 260, 261, 263, 264, 266–269, 302, 308, 309

[56] References Cited

U.S. PATENT DOCUMENTS

| | | | |
|---|---|---|---|
| 4,876,610 | 10/1989 | Ohsawa et al. | 358/433 |
| 4,878,125 | 10/1989 | Katayama et al. | 358/433 |
| 4,958,218 | 9/1990 | Katayama et al. | 358/75 |
| 5,014,134 | 5/1991 | Lawtn et al. | 358/426 X |
| 5,029,227 | 7/1991 | Kawamura | 382/199 X |
| 5,060,280 | 10/1991 | Mita et al. | 382/33 |
| 5,089,884 | 2/1992 | Suzuki et al. | 358/539 |
| 5,121,448 | 6/1992 | Katayama et al. | 382/57 |
| 5,136,396 | 8/1992 | Kato et al. | 358/426 |
| 5,138,672 | 8/1992 | Hirabayashi et al. | 382/54 |
| 5,157,741 | 10/1992 | Katayama et al. | 382/54 |
| 5,309,526 | 5/1994 | Pappas et al. | 382/237 |
| 5,321,776 | 6/1994 | Shapiro | 358/426 X |
| 5,333,212 | 7/1994 | Ligtenberg | 382/250 |
| 5,353,132 | 10/1994 | Katsuma | 358/539 |
| 5,361,147 | 11/1994 | Katayama et al. | 358/539 X |

FOREIGN PATENT DOCUMENTS 0491556  6/1992  European Pat. Off. ......... H04N 1/41

OTHER PUBLICATIONS

IEEE Transactions on Circuits and Systems, vol.CAS–34, No.11, Nov. 1987, New York, USA, pp. 1306–1336, XP37993, M.Kunt et al. "Recent Results In High Compression Image Coding", p. 1310, right col., p. 1311, left col., figures 10–13.

IEEE Signal Processing Magazine, vol.8, No.4, Oct. 1991, New York, pp. 14–38, O.Rioul, "Wavelets And Signal Processing", Box 7.

*Primary Examiner*—Peter S. Wong
*Assistant Examiner*—Gregory J. Toatley, Jr.

[57] ABSTRACT

An image processor accurately executes area separation using small block size image data. The image processor includes a wavelet transforming circuit which converts input image data into a plurality of band-limited image data, and an edge detecting circuit detects edge information in the image data based upon the band-limited image data. A character-area detecting circuit detects character areas in the image data from the distribution of the edge information, and an expansion/contraction circuit unifies the character areas based upon the detected character-area information.

10 Claims, 23 Drawing Sheets

L : LPF
H : HPF
⊖ : SAMPLING CIRCUIT

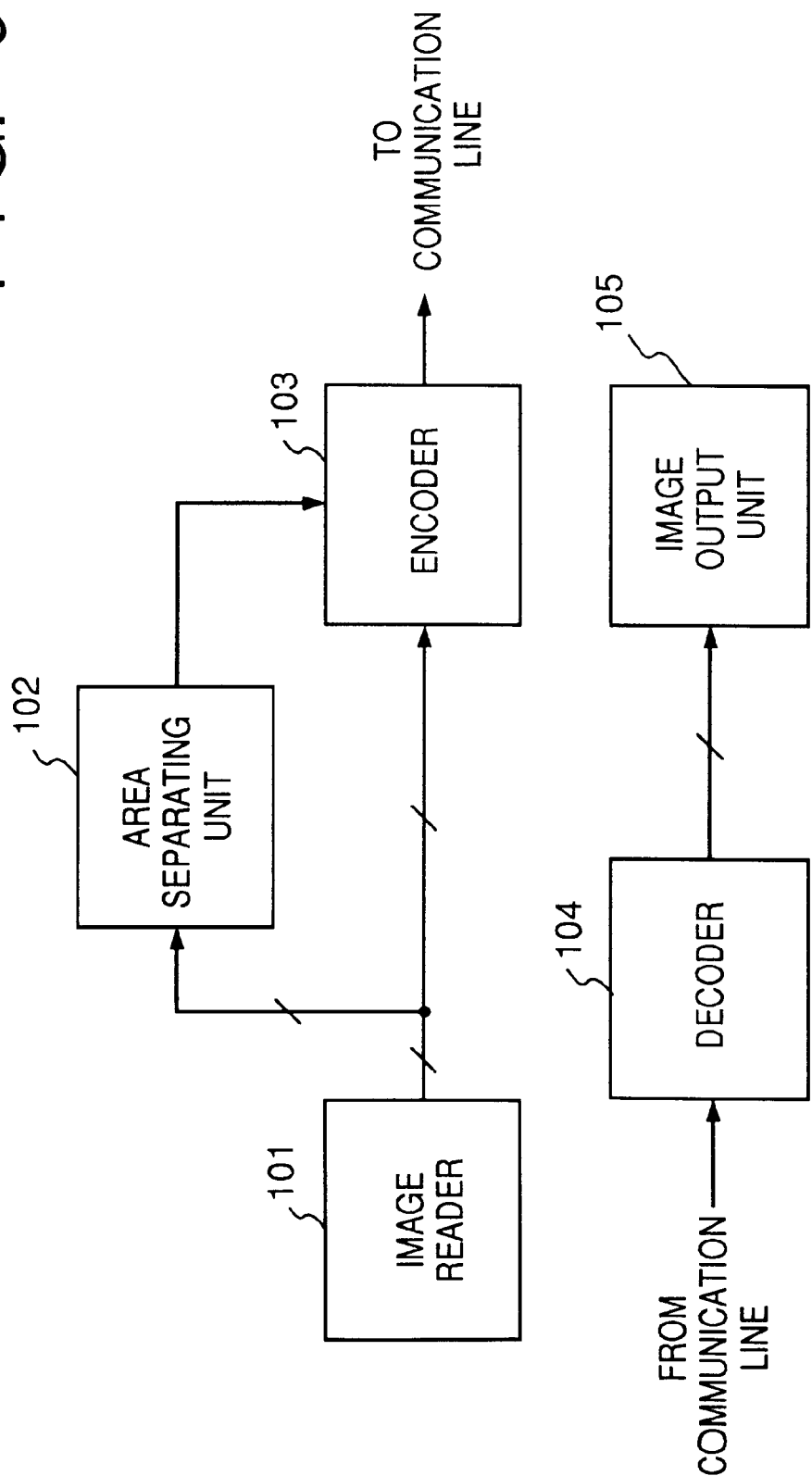

F I G. 14

| INPUT | | | | | | | | | OUTPUT (RGB) |
|---|---|---|---|---|---|---|---|---|---|
| R<TH2 | G<TH2 | B<TH2 | R>TH3 | G>TH3 | B>TH3 | \|R-G\|<TH4 | \|G-B\|<TH4 | \|B-R\|<TH4 | |
| 1 | 1 | 1 | 0 | 0 | 0 | 1 | 1 | 1 | 0 0 0 (K) |
| 0 | 1 | 1 | 1 | 0 | 0 | 1 | 0 | 0 | 1 0 0 (R) |
| 1 | 0 | 1 | 0 | 1 | 0 | 0 | 1 | 0 | 0 1 0 (G) |
| 1 | 1 | 0 | 0 | 0 | 1 | 0 | 0 | 1 | 0 0 1 (B) |
| 0 | 0 | 1 | 1 | 1 | 0 | 1 | 0 | 0 | 0 1 1 (Y) |
| 0 | 1 | 0 | 1 | 0 | 1 | 0 | 0 | 1 | 1 0 1 (M) |
| 1 | 0 | 0 | 0 | 1 | 1 | 0 | 1 | 0 | 1 1 0 (C) |

FIG. 17

| COLOR | R₁ | G₁ | B₁ | BINARY-SERIES DATA MSB → LSB | LENGTH OF 0s |
|---|---|---|---|---|---|
| WHITE | 1 | 1 | 1 | 1 — — — — — — — | 0 |
| BLACK | 0 | 0 | 0 | 0 1 — — — — — — | 1 |
| RED | 1 | 0 | 0 | 0 0 1 — — — — — | 2 |
| GREEN | 0 | 1 | 0 | 0 0 0 1 — — — — | 3 |
| BLUE | 0 | 0 | 1 | 0 0 0 0 1 — — — | 4 |
| CYAN | 1 | 1 | 0 | 0 0 0 0 0 1 — — | 5 |
| MAGENTA | 1 | 0 | 1 | 0 0 0 0 0 0 1 — | 6 |
| YELLOW | 0 | 1 | 1 | 0 0 0 0 0 0 0 0 | 7 |

IMAGE PROCESSING METHOD AND APPARATUS WHICH SEPARATES AN INPUT IMAGE INTO CHARACTER AND NON-CHARACTER AREAS

This application is a continuation of application Ser. No. 08/183,440 filed Jan. 19, 1994, now abandoned.

BACKGROUND OF THE INVENTION

1. Field of the Invention

This invention relates to an image processing method and apparatus. More particularly, the invention relates to an image processing method and apparatus, for use in a facsimile machine or copier, through which an input image is separated into a variety of images, as in the manner of a character area and a non-character area, and processing the separated input image as encoding is executed for each area into which the image has been separated.

2. Description of the Related Art

A method that relies upon the distribution of high-frequency components contained in an image often is used as a method of separating the image into character and non-character areas. This method is as follows:

(1) the image is separated into m×n blocks;
(2) edge blocks are detected by a Laplacian operation;
(3) the edge blocks are counted; and
(4) based upon the relationship between the number n of edge blocks and a threshold value T, the m×n blocks are discriminated in the following manner: a block is a character block if n>T holds, and a block is a non-character image block if n≦T holds.

Further, a color facsimile apparatus in which character areas and non-character areas are encoded by an appropriate method has been proposed [see Ser. No. 631,145 (filed on Dec. 20, 1990) and Ser. No. 651,030 (Feb. 5, 1991)].

However, a problem encountered in the prior art described above is that when the size of the m×n blocks is small, it is difficult to distinguish between an edge portion of a character area and an edge portion of a non-character area. This means that when an attempt is made to perform precise discrimination, a fairly large block size is required. This is disadvantageous in that large-scale hardware becomes necessary.

Furthermore, when conventional block processing of the kind described above is executed, edge detection is difficult if an edge is present at the boundary between one cell of m×n blocks and an adjacent cell of m×n blocks. A problem arises that a character area may be judged as being a non-character area.

Another problem in the aforementioned prior art is that the portion underlying a character area (namely a color or pattern underlying the character area) vanishes, resulting in part of the image information being lost.

SUMMARY OF THE INVENTION

An object of the present invention is to make it possible to accurately identify the characteristics of an input image.

According to the present invention, the foregoing object is attained by providing an image processing apparatus comprising input means for entering image data, conversion means for converting the image data into a plurality of band-limited image data by using a band-pass filter, and discrimination means for discriminating a characteristic of an image, which is represented by the image data, on the basis of at least one of the plurality of band-limited image data.

Another object of the present invention is to make it possible to realize such identification through a simple arrangement.

A further object of the present invention is to make effective utilization of band-limited image data.

Still another object of the present invention is to provide an efficient coding method using results obtained from the aforementioned identification.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a block diagram illustrating the construction of an image processing apparatus according to a second embodiment of the present invention;

FIG. 14 is a diagram showing an example of the relationship between the inputs and outputs of the LUT shown in FIG. 13;

FIG. 17 is a diagram showing an example of binary-series data outputted by the binary-series converting circuit 254 of FIG. 16;

DESCRIPTION OF THE PREFERRED EMBODIMENTS

An image processing apparatus according to embodiments of the present invention is described in detail below with reference to the drawings.

[First Embodiment]

Figure 1:
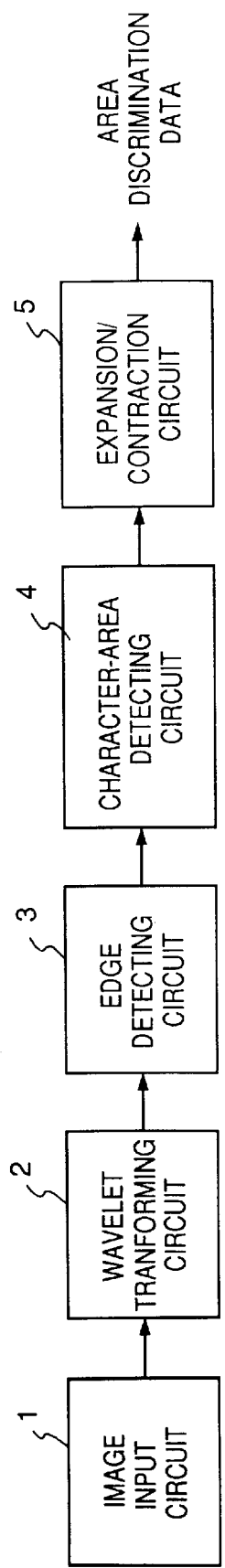
FIG. 1 is a block diagram illustrating the construction of an image processing apparatus according to an embodiment of the present invention.

FIG. 1 is a block diagram illustrating the arrangement of the first embodiment

As shown in FIG. 1, the image processing apparatus according to this embodiment includes an image input circuit 1 for entering, in line units, luminance-image data of an image which is to be separated into areas. In a case where RGB data or YMC data, etc., is applied to the image input circuit 1, the latter converts the input data into luminance-image data by a well-known method and then outputs the resulting data.

The image input circuit is connected to a wavelet transforming circuit 2. Though the details thereof are described later, the wavelet transforming circuit 2 applies a two-dimensional wavelet transformation to the image data received from the image input circuit 1, thereby delivering a third hierarchical layer, for example, of image data.

The wavelet transforming circuit 2 is connected to an edge detecting circuit 3. Though the details thereof are described later, three items of band image data, from which band image data representing the lowest frequency component is eliminated, enter the edge detecting circuit 3 from the third hierarchical layer of band image data resulting from the conversion performed by the wavelet transforming circuit 2. The edge detecting circuit 3 detects edge pixels in the input data.

A character-area detecting circuit 4 detects macro-character areas based upon the band image data applied thereto by the edge detecting circuit 3. The details are described later.

The character-area detecting circuit 4 is connected to an expansion/contraction circuit 5. Though the details are described later, the expansion/contraction circuit 5 applies dot expansion/contraction processing to character areas, which are detected by the character-area detecting circuit 4, in such a manner that scattered character areas are consolidated as much as possible. The resulting area discrimination data is then outputted.

Since a third layer of image data is used in this embodiment, the area discrimination data obtained by the foregoing processing is made a size that is one-eighth that of the input image data in both the main-scan direction (input-line direction) and sub-scan direction.

Figure 2:
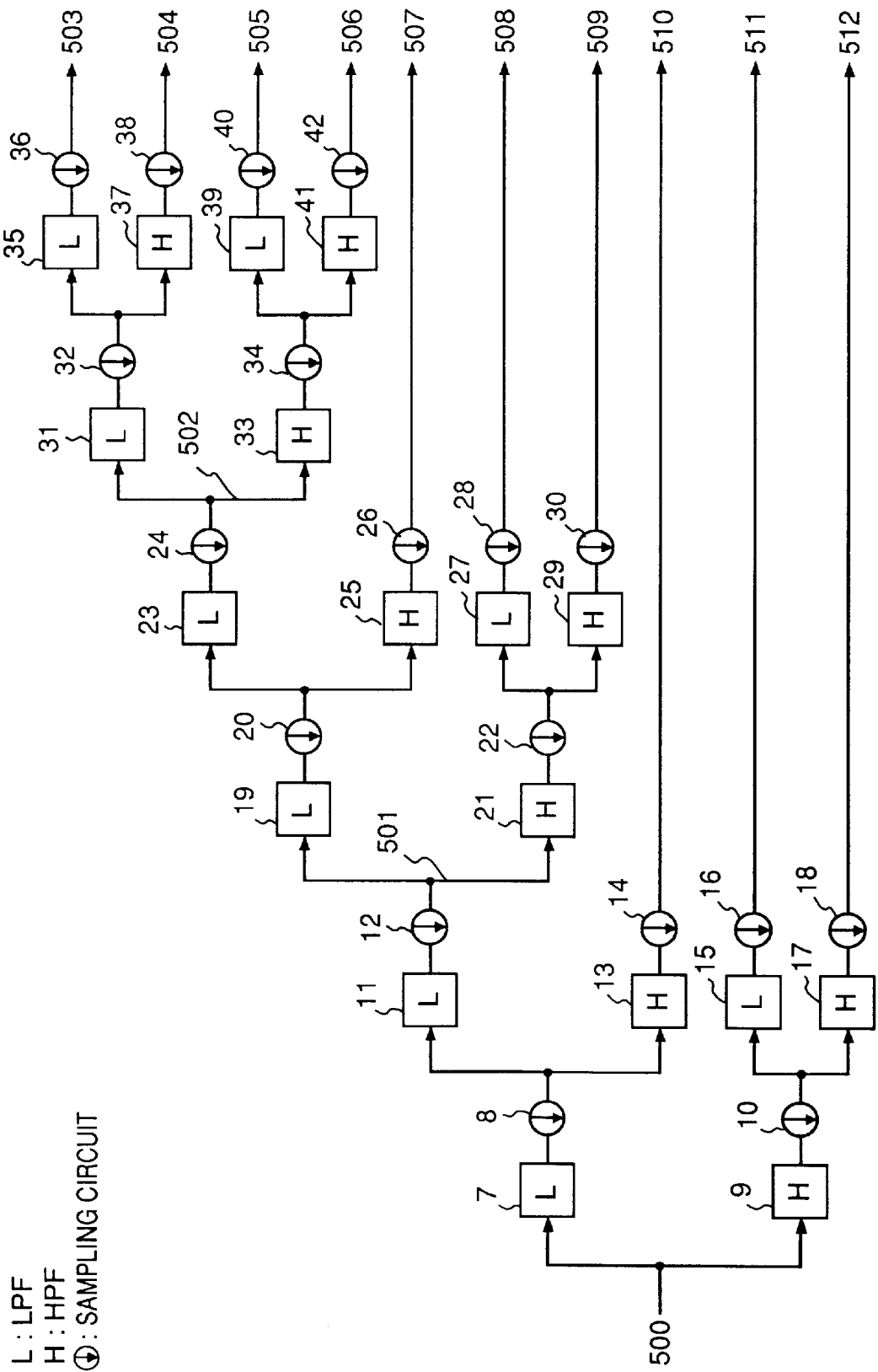
FIG. 2 is a block diagram illustrating the construction of the wavelet transforming circuit 2 shown in FIG. 1.

FIG. 2 is a block diagram illustrating the construction of the wavelet transforming circuit 2. This circuit is a four-tap filter, an example of the filter coefficients of which are shown in Table 1 below. In this embodiment, the number of taps of the filter and the number of filter coefficients are not limited to those indicated in the table.

TABLE 1

| L | H |
|---|---|
| 0.482963 | −0.129410 |
| 0.836516 | 0.224144 |
| 0.224144 | 0.836516 |
| −0.129410 | 0.482963 |

In FIG. 2, the numerals 11, 15, 19, 23, 27, 31, 35, 39 indicated by "L" represent low-pass filters (hereinafter referred to as "LPF"s). These filters apply one-dimensional low-pass filtering to the entered image data in the main-scan direction.

The numerals 9, 13, 17, 21, 25, 29, 33, 37, 41 indicated by "H" represent high-pass filters (hereinafter referred to as "HPF"s). These filters apply one-dimensional high-pass filtering to the entered image data in the main-scan direction.

Further, the numerals 8, 10, 12, 14, 16, 18, 20, 22, 24, 26, 28, 30, 32, 34, 36, 38, 40, 42 indicated by "↓" represent sampling circuits for sampling, at a ratio of 2:1 in the main-scan direction, the image data received from the immediately preceding LPF or HPF.

More specifically, the wavelet transforming circuit 2 subdivides input image data 500 into ten bands of image data 503~512 by filtering. According to this embodiment, image data 512 having the highest frequency band is obtained by passing the entered image data 500 through the circuitry HPF 9→sampling circuit 10→HPF 17→sampling circuit 18, and image data 503 having the lowest frequency band is obtained by passing the input image data 500 through the circuitry LPF 7→sampling circuit 8→LPF 11→sampling circuit 12→LPF 19→sampling circuit 20→LPF 23→sampling circuit 24→LPF 31→sampling circuit 32→LPF 35→sampling circuit 36.

Figure 3:
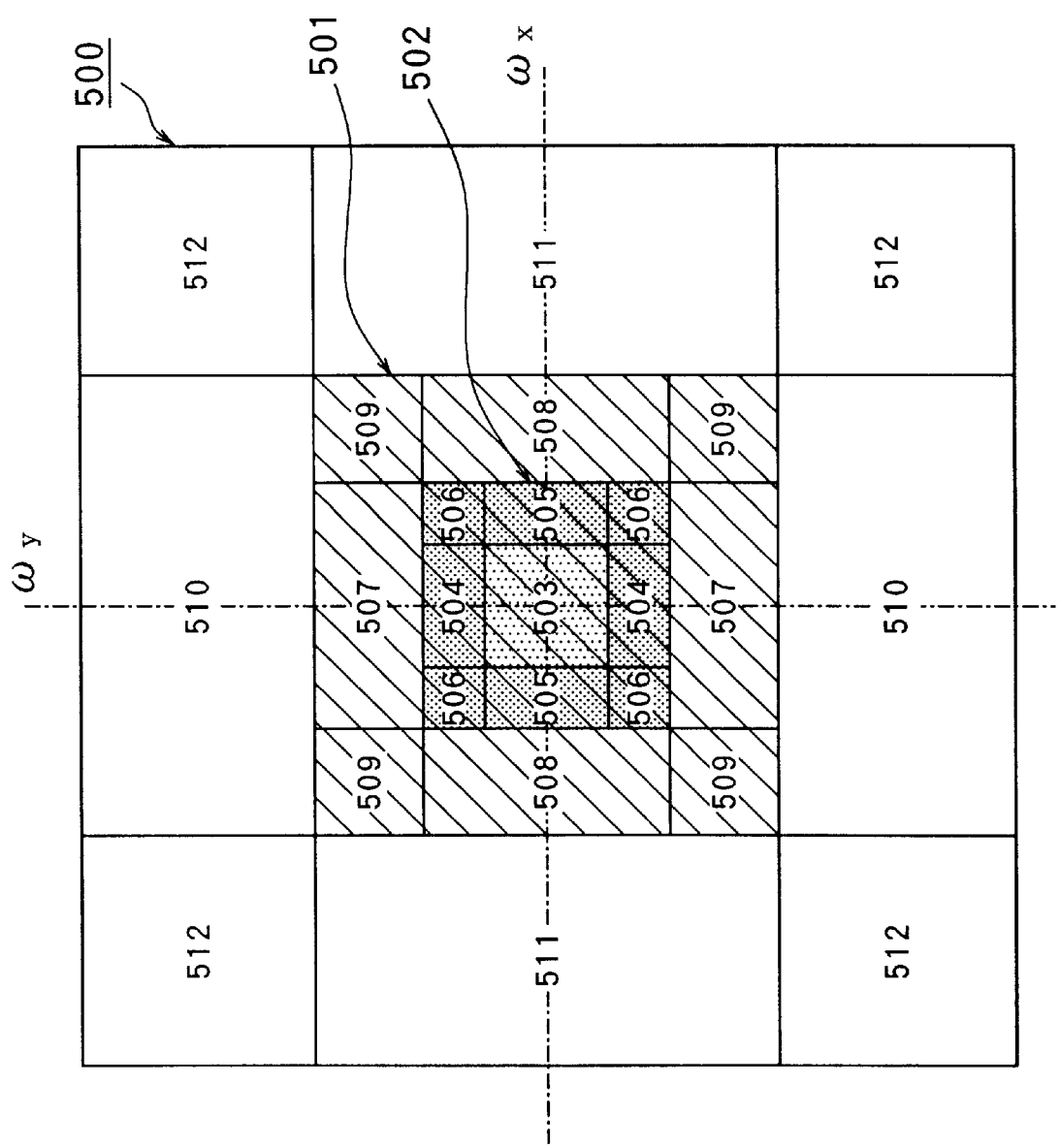
FIG. 3 is a diagram in which the hierarchical output of the wavelet transforming circuit 2 of FIG. 1 is expressed in frequency space.

FIG. 3 is a diagram in which the hierarchical output of the wavelet transforming circuit 2 is represented in frequency space.

As shown in FIG. 3, the higher the hierarchical layer of the image data (for example, image data 501 has a hierarchical layer higher than image data 500; image data 502 has a hierarchical layer higher than the image data 501; and image data 503 has a hierarchical layer higher than the image data 502), the broader the information possessed by the image.

Accordingly, in area subdivision in which broad processing is necessary in view of macro areas, this processing is achieved by using an image having a higher hierarchy. In particular, in a case where image data is subdivided into character portions and non-character portions, the character portions, for example, are simply binarized and then subjected to arithmetic encoding and the non-character portions are subjected to DCT (direct cosine transform) encoding. Good results are obtained by using image data 503~506. The reason for this is that DCT generally is performed in units of 8×8 pixels, with one pixel of image data 503~506 corresponding to 8×8 pixels of the original image.

Further, image data 504~506, which represents the high-frequency components of the image data 502, indicates the size of an edge. Accordingly, in this embodiment, edge detection is carried out using three-band image data of the image data 504~506.

The arrangement depicted in FIG. 2 outputs ten bands of image data 503~512. However, since three bands of image data are used for edge detection in this embodiment, as mentioned above, the wavelet transforming circuit 2 only needs a construction for outputting the image data 504~506.

Further, according to this embodiment, the beginning and end of processing, which represent a problem in filtering, are dealt with by periodically repeating the input image data. However, this can also be dealt with by doubling back the image, e.g., by adopting a mirror image, at the beginning and end portions of the image data.

Figure 4:
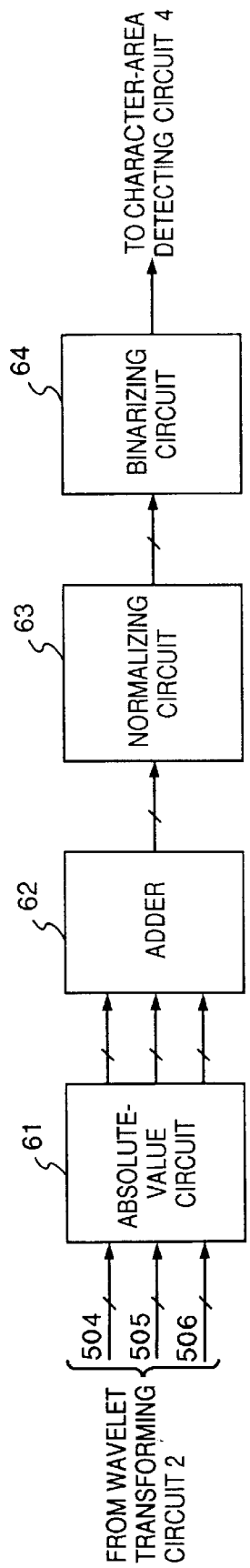
FIG. 4 is a block diagram illustrating the construction of the edge detecting circuit 3 shown in FIG. 1.

FIG. 4 is a block diagram illustrating the construction of the edge detecting circuit 3.

As shown in FIG. 4, the edge detecting circuit 3 includes an absolute value circuit 61 for outputting the absolute values of image data 504~506 received from the wavelet transforming circuit 2, an adder 62 for summing the pixel data corresponding to the three items of image data received from the absolute-value circuit 61, a normalizing circuit 63 for normalizing, to a certain range (e.g., 0~255), the summed data received from the adder 62, and a binarizing circuit 64 for binarizing the normalized data, received from the normalizing circuit 63, at a certain threshold value and outputting the results. Through the binarizing threshold value is made 40, for example, this does not impose a limitation upon the invention; an appropriate threshold value should be set in conformity with the distribution of the image data.

More specifically, the edge detecting circuit 3 extracts only pixels (namely an edge) exhibiting a somewhat abrupt change in tone on the basis of the image data 504~506. For example, an edge pixel is outputted as a "1" and a non-edge pixel is outputted as a "0".

It is also possible to find an edge from the image data 503 without using the image data 504~506. In such case, if the edge detecting circuit 3 is constructed to subject the image data 503 to a Laplacian operation or the like to extract an edge and then binarize the results upon taking the absolute value, then binary data approximately the same as that provided by the arrangement of FIG. 4 is outputted.

The character-area detecting circuit 4 detects character areas based upon the binary data outputted by the edge detecting circuit 3.

Figure 5:
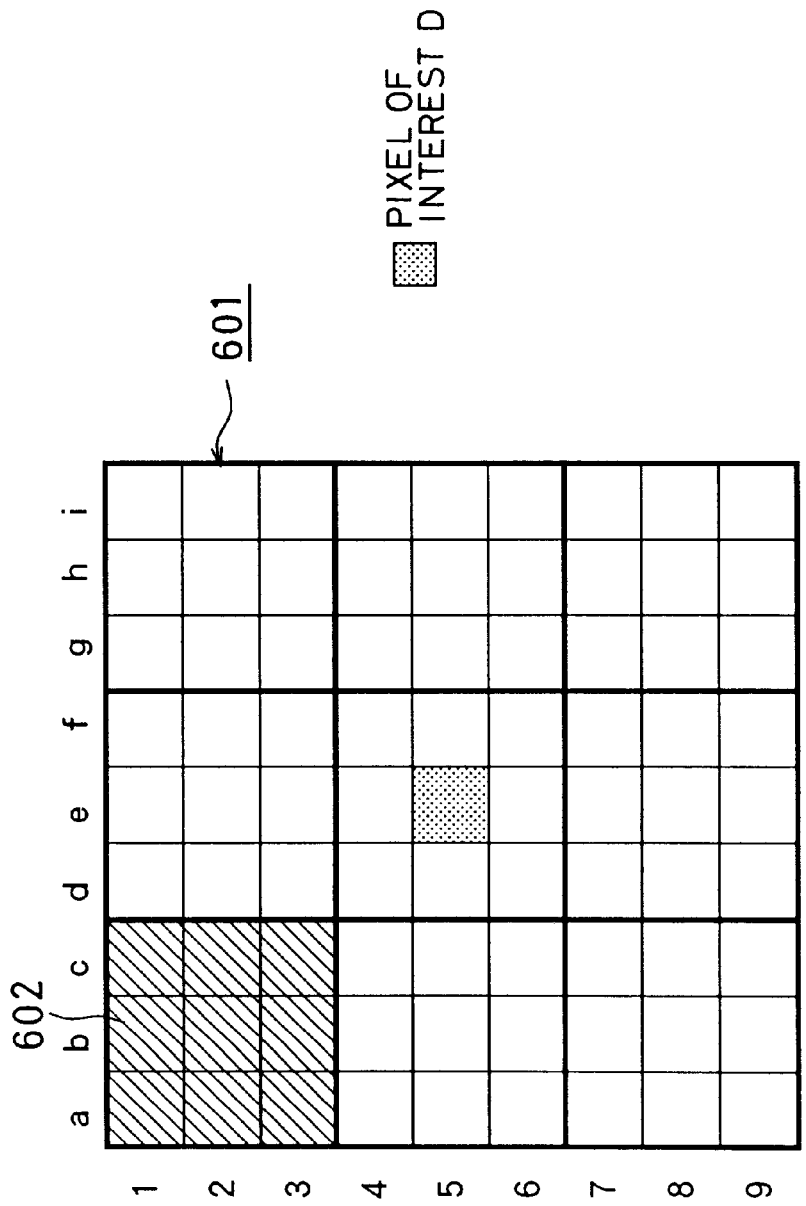
FIG. 5 is a diagram for describing an example of the operation of the character-area detecting circuit 4 shown in FIG. 1.

FIG. 5 is a diagram for describing the operation of the character-area detecting circuit 4. The center of the diagram illustrates a pixel of interest D.

According to this embodiment, a character area is detected based upon 9×9 pixels 601 the center of which is the pixel of interest D. The 9×9 pixels 601 are subdivided into blocks 602 of 3×3 pixels each. A number of edges E representing how many edges are present in a block, and a number of blocks NB representing how many blocks for which the edge count E exceeds a threshold value ET are present, and are counted block by block. If the relation NUMBER OF BLOCKS NB≧4 holds, it is judged that the pixel of interest D is part of a character area.

Figure 6:
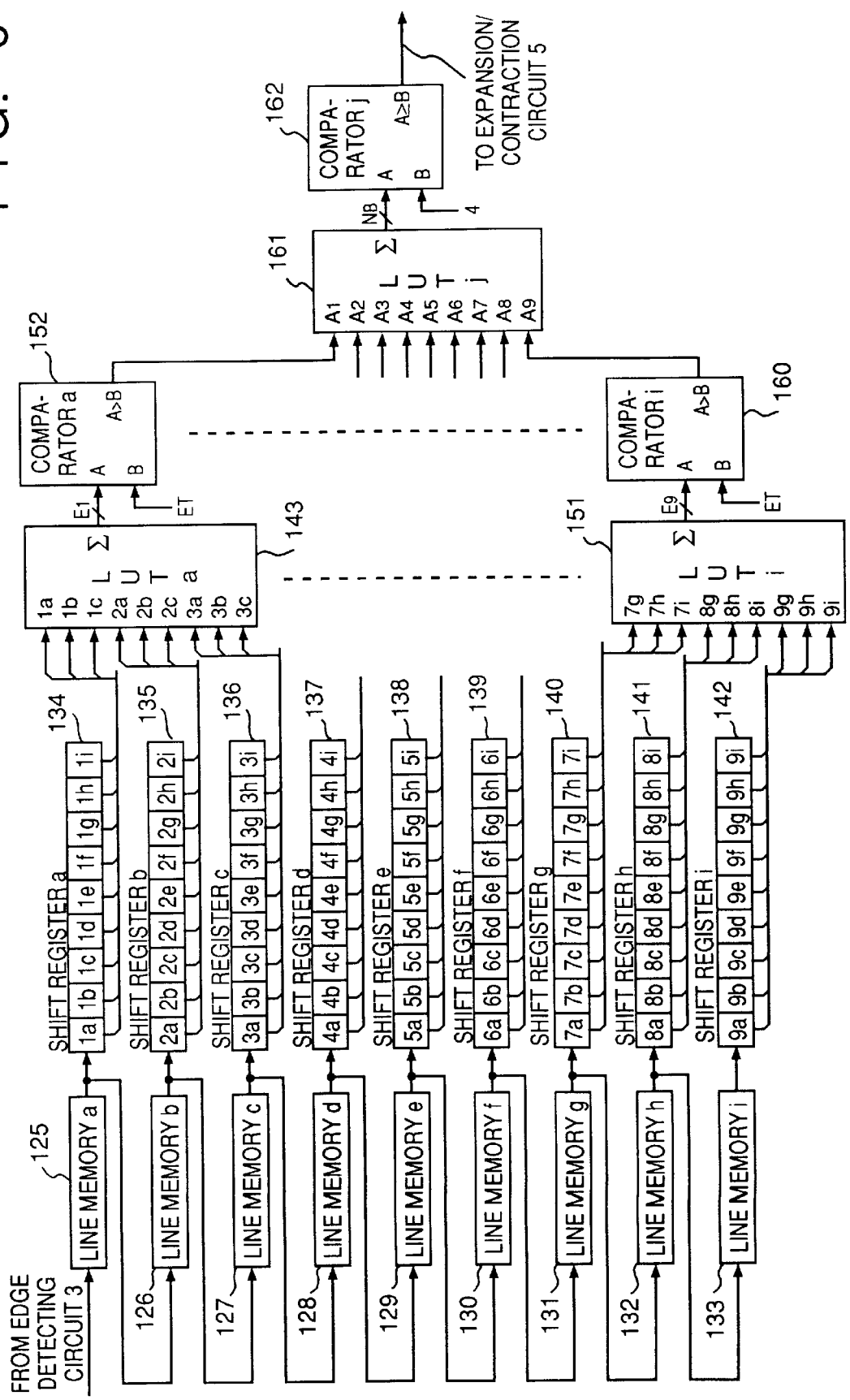
FIG. 6 is a block diagram illustrating the construction of the character-area detecting circuit 4 shown in FIG. 1.

FIG. 6 is a block diagram illustrating the construction of the character-area detecting circuit 4.

As shown in FIG. 6, the character-area detecting circuit 4 includes line memories 125~133 for successively storing one line of the binary data received from the edge detecting circuit 3. Shift registers 134~142 are used to successively store the binary data outputted by the corresponding line memories. Each shift register holds nine pixels of binary data. In other words, the shift registers 134~142 hold binary data representing the 9×9 pixels 601 shown in FIG. 5.

Numerals 143~151 denote LUTs, each of which is constituted by a ROM, for example, having address terminals to which nine bits of data enter from prescribed bits of corresponding shift registers. Each LUT delivers a value, namely the number of "1"s (the number of edges E) conforming to this nine-bit data, from its output terminal. The LUT (a) 143 outputs the number of edges E1 in the 3×3 pixels 602, namely the pixels $1a, 1b, 1c, 2a, 2b, 2c, 3a, 3b, 3c$. Similarly, each of the LUTs 144~151 outputs a number of edges En present in the corresponding nine pixels.

Numerals 152~160 denote comparators. The comparator (a) 152 compares the edge number E1, received from the LUT (1) 143, with the threshold value ET and outputs a "1" if E1>ET holds and a "0" if E1≦ET holds.

Similarly, the comparators 153~160 compare the edge numbers from the corresponding LUTs with the threshold value ET and outputs a "1" if En>ET holds and a "0" if En≦ET holds.

Numeral 161 denotes a LUT (j), which is constituted by a ROM, for example. The LUT 161 provides a value, namely the number of "1"s (the number of blocks NB) conforming to the nine-bit data received at its address terminals from the comparators 152~160.

Numeral 162 denotes a comparator for comparing the number of blocks NB received from the LUT (j) 161 with the criterion "4" on the basis of which an area is judged to be a character area. The comparator 161 outputs "1" is NB≧4 holds and "0" if NB≦4 holds.

It should be noted that the operation of each block shown in FIG. 6 is synchronized by a pixel clock VCLK.

Thus, the character-area detecting circuit 4 outputs a character-area pixel as "1" and a non-character-area pixel as "0".

Though threshold value ET=1 in this embodiment, any appropriate value may be used in dependence upon the image processed.

Further, according to this embodiment, block number B≧4 is adopted as the criterion for judging that an area is a character area. The reason being that there are many cases in which B<4 holds, as in the case of a contour line of a non-character area in a photograph, for example. In this way the contour line of a non-character area in a photograph is avoided as being taken as part of a character area. Furthermore, in this embodiment, the criterion for judging a character area is not limited to B≧4; other suitable values may be used in dependence upon the image processed.

The judgment made by the character-area detecting circuit 4 is provided to the expansion/contraction circuit 5. The latter executes processing for joining and consolidating pixels, especially those that are scattered, judged as forming a character area. This is processing for roughly separating the input image data into character and non-character areas. This processing comprises the two steps described below.

The first step of this processing is expansion processing in which reference is made to, for example, the eight pixels surrounding the pixel of interest to determine if there is at least one black pixel (a "1" pixel) among them. If there is, the pixel of interest is changed to black. The second step is contraction processing in which reference is made to, for examples the eight pixels surrounding the pixel of interest to determine if there is at least one white pixel (a "0" pixel) among them. If there is, the pixel of interest is changed to white.

More specifically, the expansion/contraction circuit 5 subjects the binary data received from the character-area detecting circuit 4 first to expansion processing ml times, then to contraction processing n times and finally to expansion processing m2 times.

The initial expansion processing is for the purpose of joining and consolidating scattered character pixels. Character pixels thus joined are not caused to scatter again by the subsequent contraction processing.

Ordinarily, the expansion processing operation and the contraction processing operation are each executed several times. Isolated pixels that are not caused to join with other pixels by the expansion processing also remain as isolated pixels when contraction processing is executed. Many such isolated pixels reside in a non-character area such as a photograph, for example. If these isolated pixels are processed in the order of expansion-contraction-expansion as in this embodiment, they are eliminated by the contraction processing. This makes it possible to reduce erroneous judgment.

In this embodiment, m1, m2, n, which represent the number of times expansion/contraction processing is executed, are set to 4, 1, 5, respectively. However, it will suffice if these values are integers that satisfy the following equation:

$$n = m1 + m2 \quad (1)$$

The expansion/contraction circuit 5, which is constituted by an image memory (not shown) and a single-chip CPU (not shown), executes the foregoing processing in accordance with a program stored in a ROM incorporated within the CPU. The image memory stores the binary data, which has been outputted by the character-area detecting circuit 4, at the corresponding pixel positions.

Figure 7:
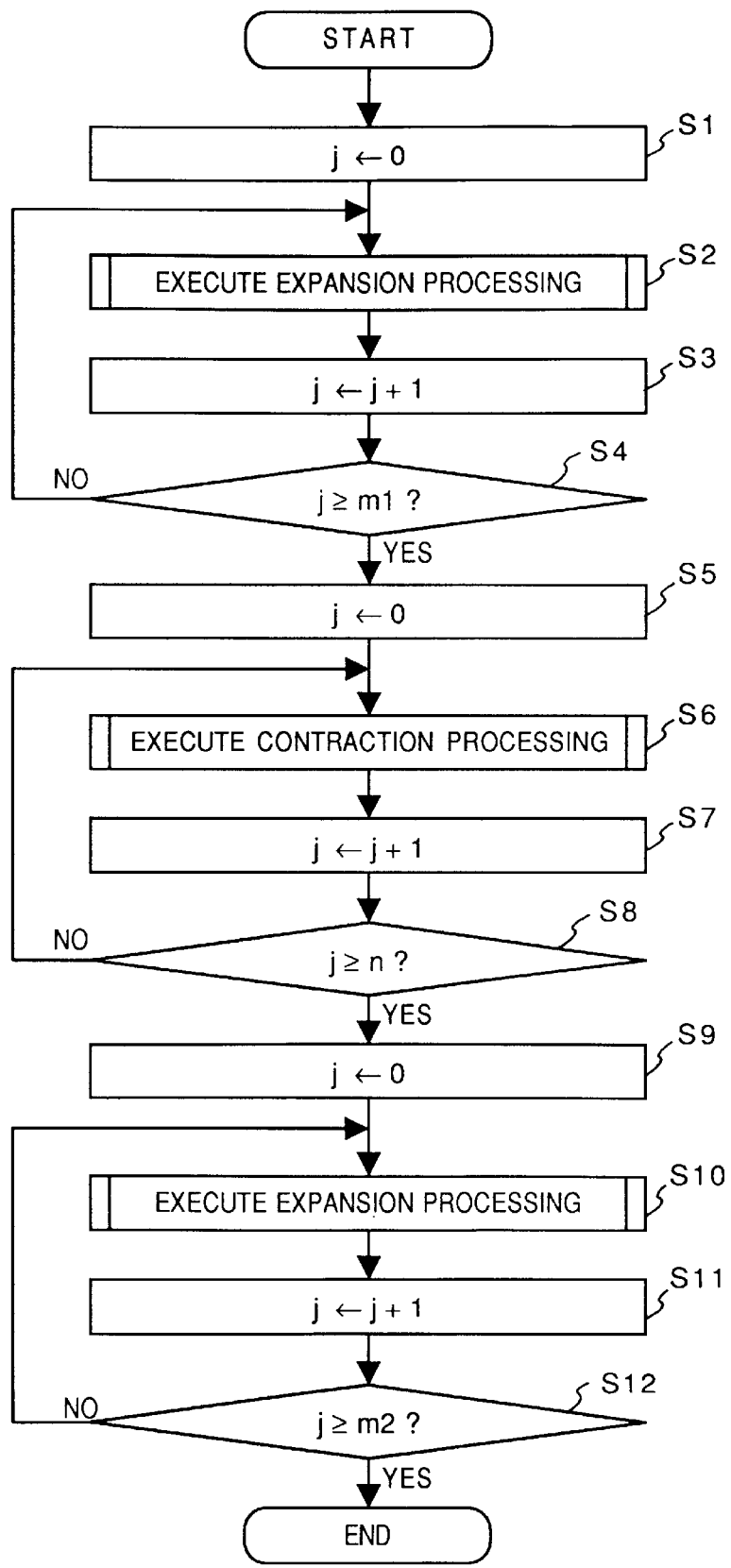
FIG. 7 is a flowchart illustrating the operating procedure of the expansion/contraction circuit 5 shown in FIG. 1.

FIGS. 7 and 8 are flowcharts illustrating the operating procedure of the expansion/contraction circuit 5.

Figure 8A:
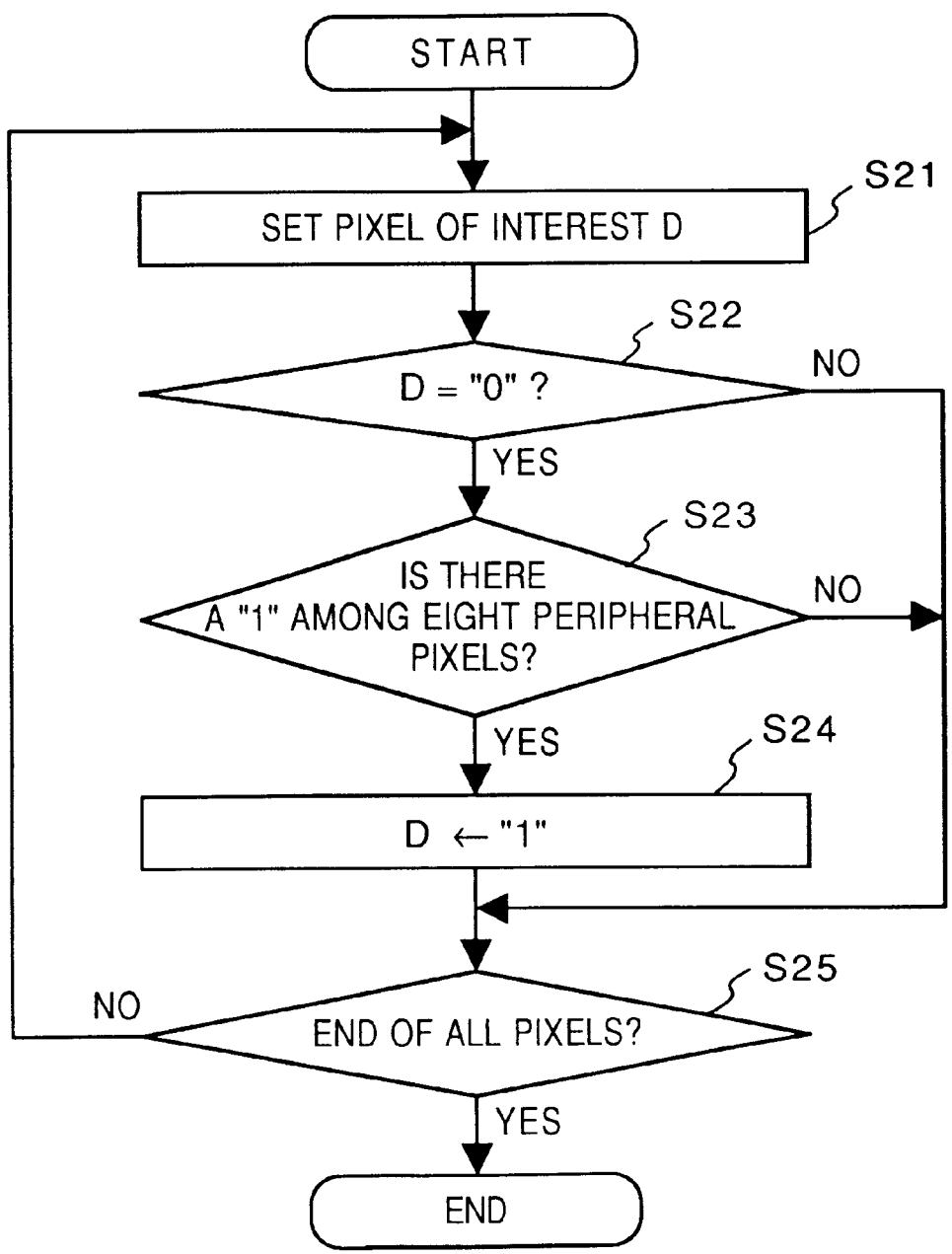
FIGS. 8A and 8B are flowcharts illustrating the operating procedure of the expansion/contraction circuit 5 shown in FIG. 1.
Figure 8B:
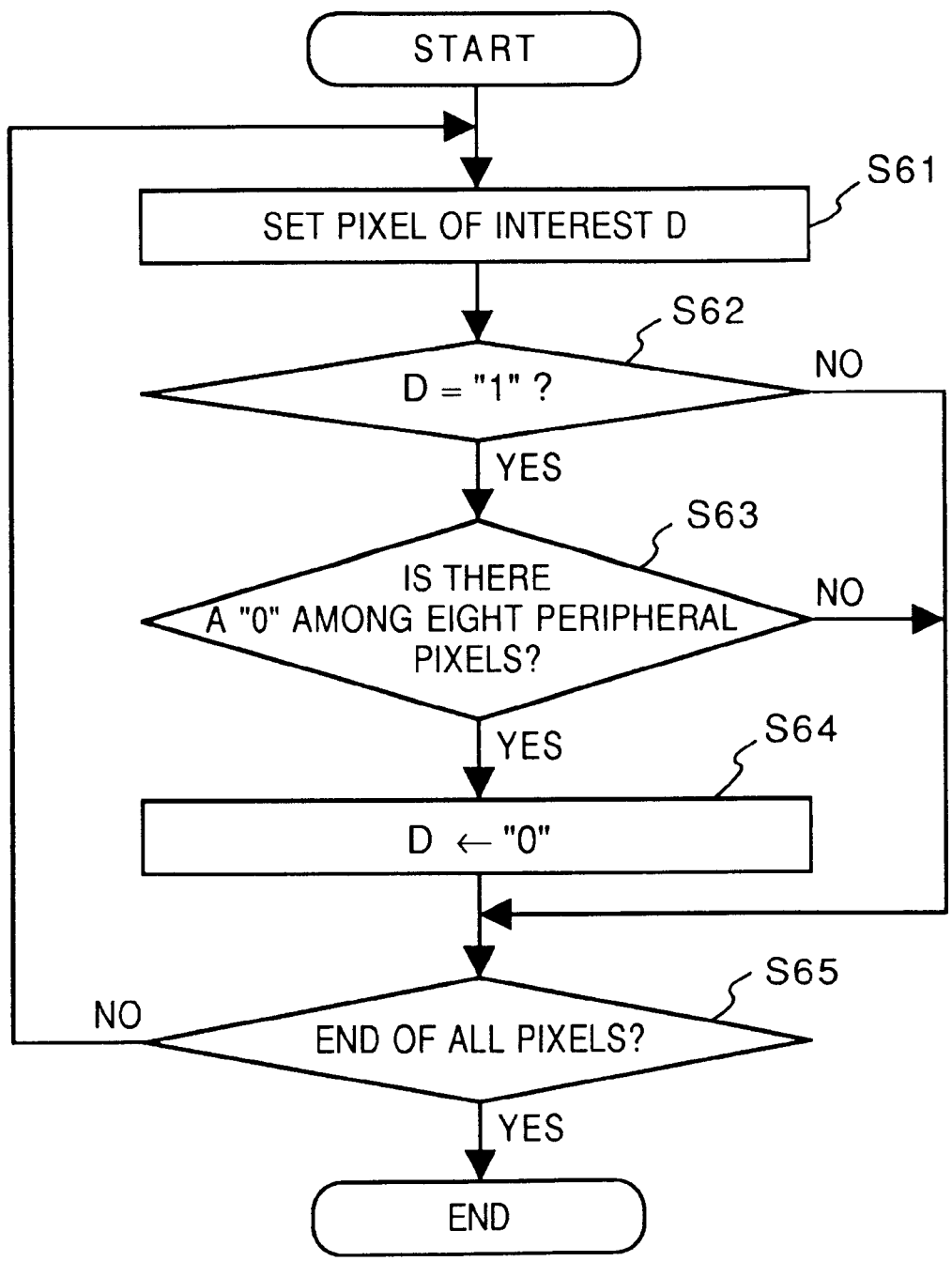

According to this embodiment, as illustrated in FIGS. 7, 8A and 8B, a variable j is set to 0 at step S1, expansion processing is executed at step S2 and the variable j is incremented at step S3.

Next, the variable j and the processing count m1 are compared at step S4. The program returns to step S2 if j<m1 holds and proceeds to step S5 if j≧m1 holds.

If j≧m1 holds, the variable j is set to 0 again at step S5, contraction processing is executed at step S6 and the variable j is incremented at step S7.

Next, the variable j is compared with the processing count n at step S8. The program returns to step S6 if j<n holds and proceeds to step S9 if j≧n holds.

The variable j is set to 0 again at step S9 if j≧n holds, expansion processing is executed at step S10 and the variable j is incremented at step S11

The variable j and the processing count m2 are compared at step S12. The program returns to step S10 if j<m2 holds and processing is terminated if j≧m2 holds.

FIG. 8A is a flowchart illustrating the expansion processing procedure.

According to this embodiment, as shown in FIG. 8A, a pixel of interest D is set at step S21 and the value of the pixel of interest D is judged at step S22. The program proceeds to step S23 if D="0" holds and jumps to step S25 if D="1" holds.

In case of D="0", it is determined at step S23 whether the eight peripheral pixels contains a black pixel (a "1" pixel). The program proceeds to step S24 if there is a black pixel and to jumps to step S25 in the absence of a black pixel.

In case of a black pixel, the pixel of interest D is set to "1" (black) at step S24.

Next, it is determined at step S25 whether or not the processing of all pixels has ended. The program proceeds to step S21 if processing has not ended and returns to the main routine of FIG. 7 if processing has ended.

FIG. 8B is a flowchart illustrating the contraction processing procedure.

According to this embodiment, as shown in FIG. 8B, a pixel of interest D is set at step S61 and the value of the pixel of interest D is judged at step S62. The program proceeds to step S63 if D="1" holds and jumps to step S65 if D="0" holds.

In case of D="1", it is determined at step S63 whether the eight peripheral pixels contains a white pixel (a "0" pixel). The program proceeds to step S64 if there is a white pixel and jumps to step S65 in the absence of a white pixel.

In case of a white pixel, the pixel of interest D is set to "0" (white) at step S64.

Next, it is determined at step S65 whether or not the processing of all pixels has ended. The program proceeds to step S61 if processing has not ended and returns to the main routine of FIG. 7 if processing has ended.

Thus, the expansion/contraction circuit 5 outputs binary image data, in which a pixel of a character area is made "1" (black), as the result of discriminating a character area.

In accordance with this embodiment, as described above, image data having frequency components of a third hierarchical layer following a wavelet transformation is used in area discrimination. As a result, highly accurate character-area discrimination is performed in units of 8×8 pixels of the original image. It is particularly beneficial when the results of discrimination are utilized in standard compression (so-called ADCT) of a JPEG color image.

Further, in accordance with this embodiment, band-limited image data per se, from which image data having the lowest frequency band following wavelet transformation has been removed, represents the edge quantity (the high-frequency components). Therefore, processing such as a Laplacian operation need not be applied anew, processing speed is raised and circuitry is simplified. Furthermore, since extraction of a character area from a local edge is carried out by scanning a window in pixel units rather than by executing block processing, erroneous judgments at block boundaries, which is a problem in the prior art, is reduced in number.

Further, in accordance with this embodiment, isolated pixels are eliminated by executing processing in the order of expansion-contraction-expansion when joining character areas as post-processing. This makes it possible to improve the accuracy with which character and non-character areas are judged.

[Second Embodiment]

A second embodiment of the present invention is described below. The second embodiment deals with an image communication apparatus such as a color facsimile machine that incorporates the first embodiment in the form of an area separating unit. Components similar to those of the first embodiment are designated by like reference characters in the second embodiment and need not be described in detail again.

FIG. 9 is a block diagram illustrating the construction of the second embodiment.

As shown in FIG. 9, an image reader 101 scans the image of an original by a CCD line sensor, for example, and outputs eight-bit image data in each of the colors R, G, B. An area separating unit 102, to which the image data from the image reader 101 is applied, separates the image data into character and non-character areas. Though the details are described later, an encoder 103 encodes the image data, received from the image reader 101, on the basis of the data received from the area separating unit 102, and outputs the encoded data on a communication line. Though the details are described later, a decoder 104 decodes encoded data, received from a communication line, into image data. An image output unit 105 outputs an image from the image data received from the decoder 104. The image output unit 105 is constituted by a page printer such as a laser-beam printer, a serial printer such as an ink-jet printer or a display device such as a CRT.

[Encoder 103]

Figure 10:
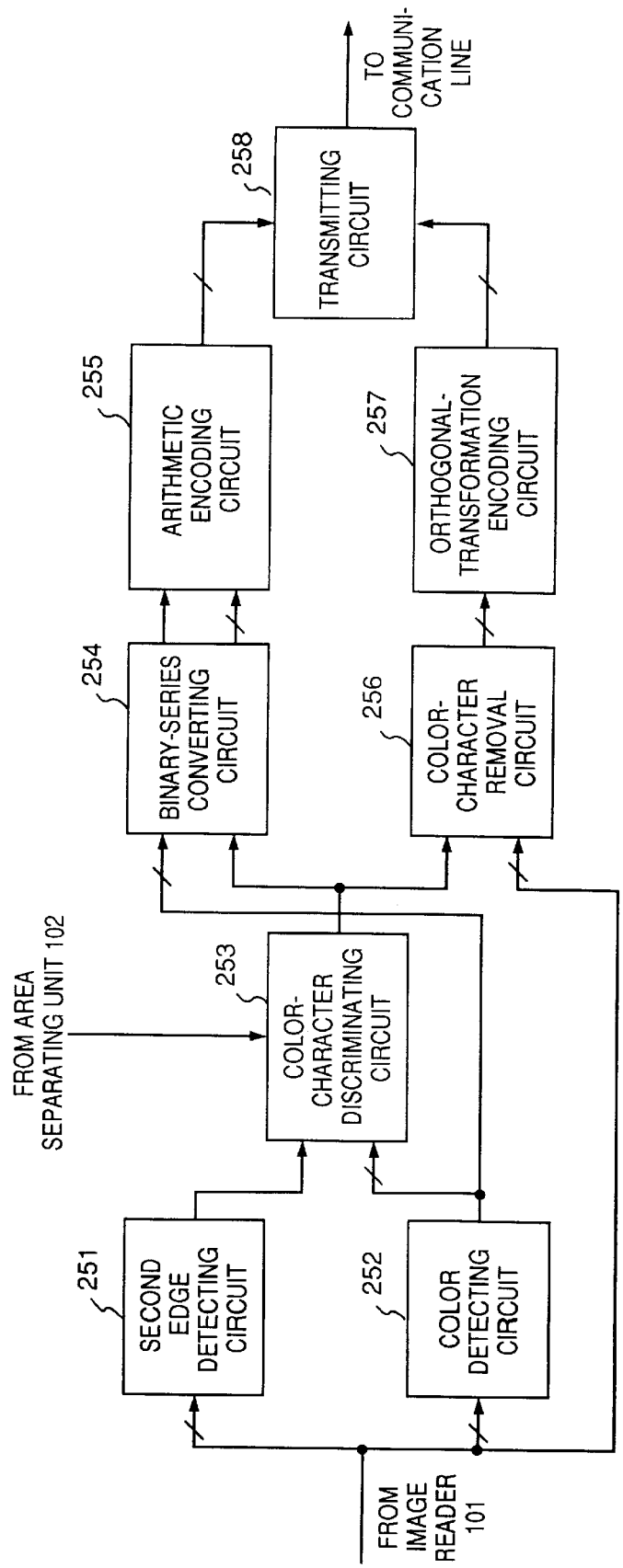
FIG. 10 is a block diagram illustrating the construction of the encoder 103 shown in FIG. 9.

FIG. 10 is a block diagram illustrating the construction of the encoder 103.

The encoder 103 includes a second edge detecting circuit 251 which, as described in detail below, detects edge pixels in the image data received from the image reader 101, a color detecting circuit 252 which, as described in detail below, detects prescribed color pixels in the image data received from the image reader 101, and a color-character discriminating circuit 253 which, as described in detail below, is provided with the character-area data from the area separating unit 102, the results of edge-pixel detection from the second edge detecting circuit 251 and the results of prescribed color-pixel detection from the color detecting circuit 252, for detecting an edge and a pixel of a prescribed color contained in a character area. In other words, the discriminating circuit 253 detects a pixel of a color character.

The encoder 103 further includes a binary-series converting circuit which, as is described in detail below, converts the color-character data from the color detecting circuit 252 into binary-series data, which is suitable for dynamic arithmetic coding, in dependence upon the results of discrimination from the color-character discriminating circuit 253, and an arithmetic encoding circuit 255 for dynamically arithmetically encoding the binary-series data received from the binary-series converting circuit 254. It should be noted that the encoding method of the arithmetic encoding circuit 255 and the construction of this circuit are as illustrated in the specification of Japanese (Laid-Open) Patent Application (KOKAI) No. 2-65372 (U.S. Pat. No. 5,136,396).

Further, as is described in detail below, a color-character removal circuit 256 replaces a pixel in the image data from the image reader 101 that the color-character discriminating circuit has judged to be a color-character pixel with, for example, the average value of the pixel block containing this pixel. An orthogonal-transformation encoding circuit 257 encodes the image data from the color-character removal circuit 256 in accordance with the aforementioned ADCT method, by way of example. A transmitting circuit 258 combines the encoded data received from the arithmetic encoding circuit 255 and the orthogonal-transformation coding circuit 257 and outputs the result on a communication line. It should be noted that the transmitting circuit 258 first transmits the code of a color character and then transmits the codes of signals Y, Cr', Cb' field-sequentially. However, a flag indicating the contents of each code is transmitted before the code. Further, the transmitting circuit 258 temporarily stores the codes in memory, thereby compensating for a time shift conforming to the transmission sequence of the codes.

The reason for detecting color characters in character areas separated by the area separating unit 102 in the coder 103 is now described.

The area separating unit 102 separates character areas from image data irrespective of what underlies these areas (e.g., light background colors, patterns, etc.). Therefore, when a pixel, judged as being contained in a character area by the area separating unit 102 is binarized as is, the underlying background is lost.

Accordingly, in this embodiment, a color character discriminated by the color-character discriminating circuit 253 is removed from the image data by the color-character removal circuit 256, and the portion from which the color character has been removed is compensated for by using the average value of the surrounding pixels, thereby forming the underlying background. This is then encoded by the orthogonal-transformation encoding circuit 257.

The second edge detecting circuit 251 is now described.

Figure 11:
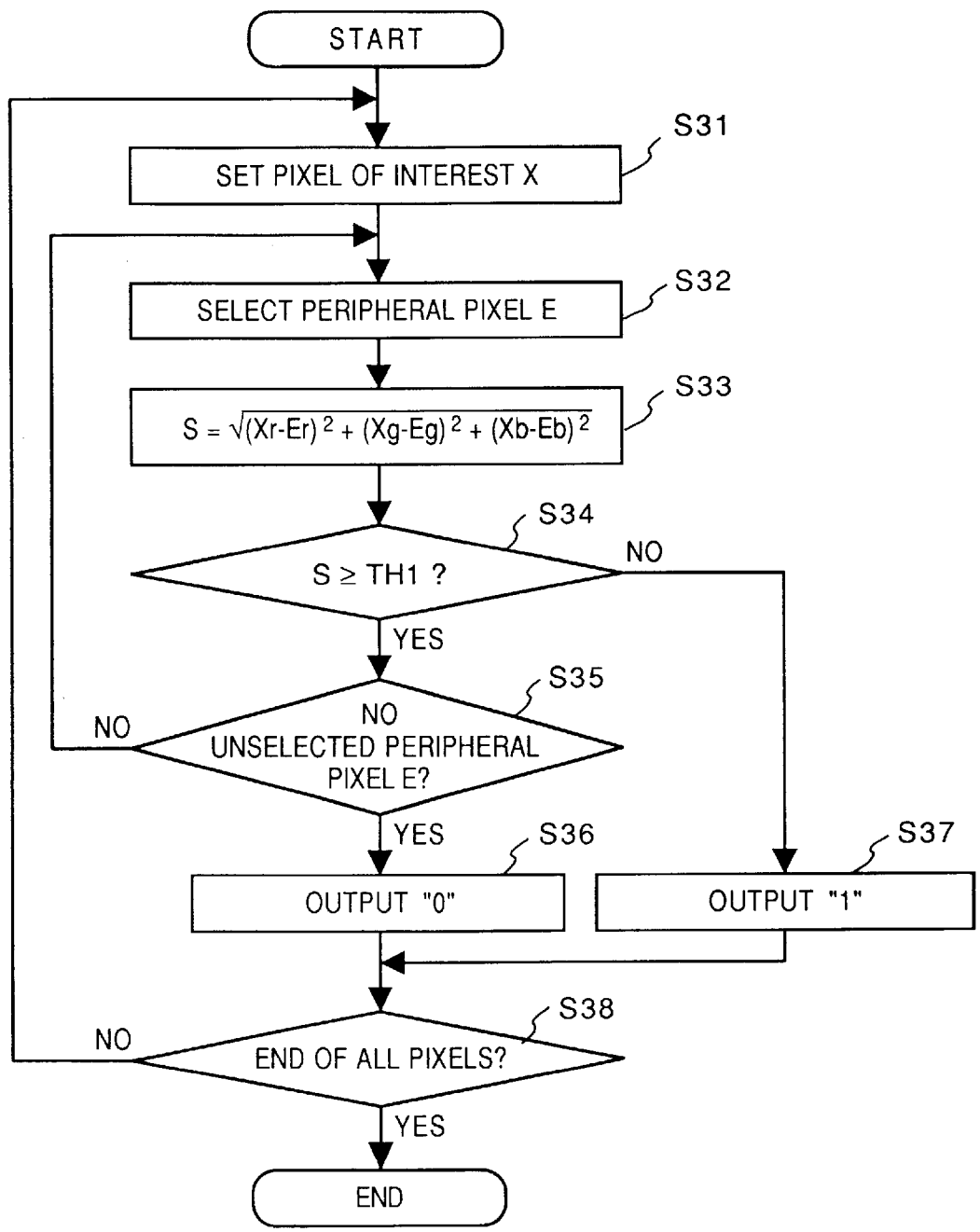
FIG. 11 is a flowchart illustrating an edge-pixel detecting procedure of the second edge detecting circuit 251 shown in FIG. 10.

FIG. 11 is a flowchart illustrating the procedure of edge pixel detection performed by the second edge detecting circuit 251.

The second edge detecting circuit 251 comprises an image memory (not shown), a single-chip CPU (not shown), etc., and executes the procedure of FIG. 11 in accordance with a program stored in a ROM incorporated within the CPU.

In accordance with this embodiment, as shown in FIG. 11, a pixel of interest X is set at step S31 and a peripheral pixel E is selected at step S32. The selected peripheral pixel E may be any one of the pixels A~D shown in FIG. 12.

Next, the operation indicated by the following equation is executed at step S33:

$$S = \sqrt{\{(Xr - Er)^2 + (Xg - Eg)^2 + (Xb - Eb)^2\}} \quad (2)$$

where Xr, Er: R data
Xg, Eg: G data
Xb, Eb: B data

This is followed by step S34, at which the result S of calculation and a threshold value TH1 are compared. The program proceeds to step S35 if $S \leq TH1$ holds and to step S37 if S>TH1 holds.

If S>TH1 holds, "1" is outputted at step S37. Next, it is determined at step S38 whether detection processing regarding all pixels has been executed. The program returns to step S31 if there are unprocessed pixels and the procedure is terminated if all pixels have been processed.

Thus, the second edge detecting circuit 251 calculates the three-dimensional spatial distance between the pixel of interest X and the peripheral pixels A~D in accordance with Equation (2). In a case where the result S exceeds the threshold value TH1 (e.g., 100), it is judged that an edge is present between the pixel of interest X and the peripheral pixels A~D. If it is judged that there is at least one edge between the pixel of interest X and the peripheral pixels A~D, "1" (an edge pixel) is outputted as the result of judging the pixel of interest X. In accordance with this method of detection, it is possible to detect color edges having different hues and saturations even if the brightness is the same. This is very effective in terms of detecting color characters.

Figure 12:
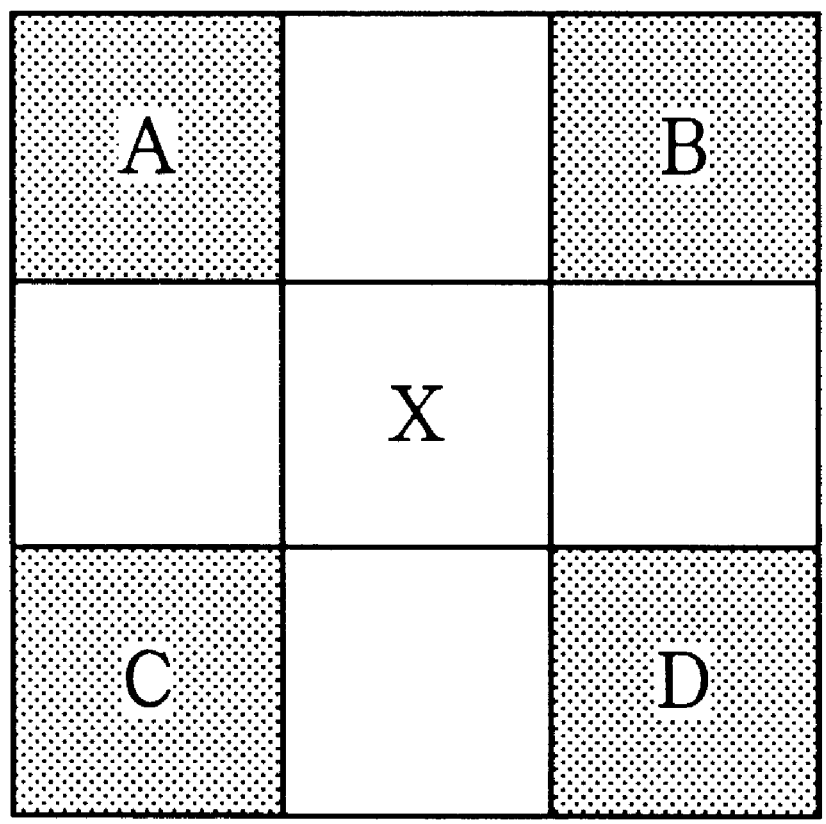
FIG. 12 is a diagram showing an example of the relationship between a pixel of interest X and peripheral pixels.

In addition to discriminating edges pixel by pixel, the second edge detecting circuit 251 determines whether an edge pixel is contained in an 8×8 pixel block to be processed in the color-character removal circuit 256 and orthogonal transformation encoding circuit 257, described below, and outputs the result of this determination. Though FIG. 12 illustrates an example of peripheral pixels for the purpose of performing edge detection, the embodiment is not limited to this example. For instance, eight peripheral pixels may be used and the operation of Equation (2) may be performed based upon the average value of peripheral pixels and the pixel of interest X.

The color detecting circuit 252 is described next.

Figure 13:
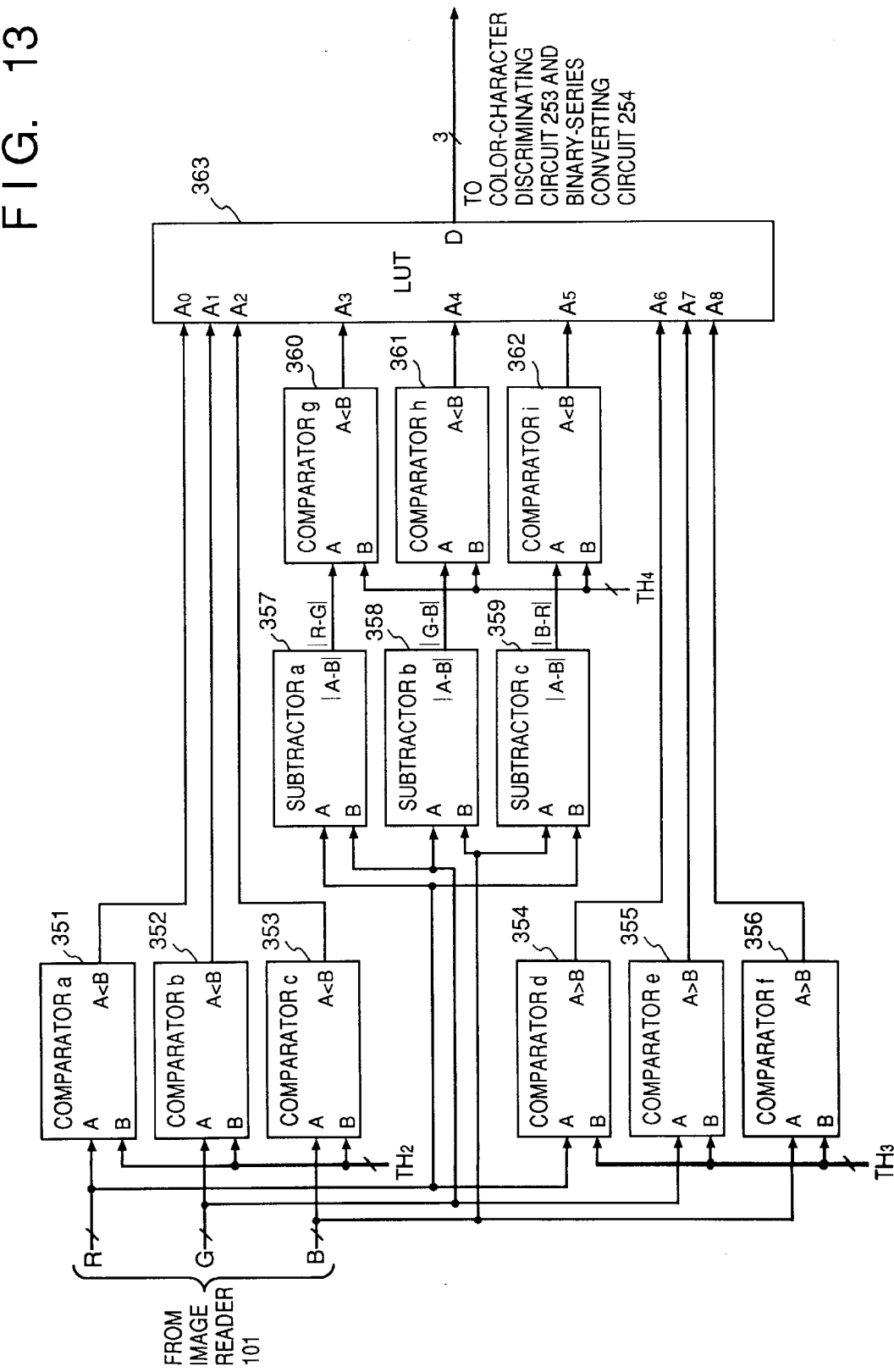
FIG. 13 is a block diagram illustrating the construction of the color detecting circuit 252 shown in FIG. 10.

FIG. 13 is a block diagram illustrating the construction of the color detecting circuit 252.

As shown in FIG. 13, the color detecting circuit 252 includes comparators 351~353, 354~356, subtractors 357~359 and comparators 360~362. The comparator (a) 351, for example, compares input data R with a threshold value TH2 and outputs "1" if R<TH2 holds and "0" if $R \geq TH2$ holds. Similarly, the comparator (b) 352 outputs "1" if G<TH2 holds and "0" if $G \geq TH2$ holds, and the comparator (c) 353 outputs "1" if B<TH2 holds and "0" if $B \geq TH2$ holds.

The comparator (d) 354, for example, compares input data R with a threshold value TH3 and outputs "1" if R>TH3 holds and "0" if R≦TH3 holds. Similarly, the comparator (e) 355 outputs "1" if G>TH3 holds and "0" if G≦TH3 holds, and the comparator (f) 356 outputs "1" if B>TH3 holds and "0" if B≦TH3 holds.

The subtractor (a) 357 outputs an absolute value |R−G| of the difference between the input data R and G, the subtractor (b) 358 outputs an absolute value |G−B| of the difference between the input data G and B, and the subtractor (c) 359 outputs an absolute value |B−R| of the difference between the input data B and R.

The comparator (g) 360, for example, compares input data |R−G| with a threshold value TH4 and outputs "1" if |R−G|<TH4 holds and "0" if |R−G|≧TH4 holds. Similarly, the comparator (h) 361 outputs "1" if |G−B|<TH4 holds and "0" if |G−B|≧TH4 holds, and the comparator (i) 362 outputs "1" if |B−R|<TH4 holds and "0" if |B−R|≧TH4 holds.

Numeral 363 denotes a LUT, constituted by a ROM, for example, having an output terminal D for outputting results of color discrimination conforming to the results of comparison applied to address terminals A from the nine comparators mentioned above.

FIG. 14 is a diagram illustrating an example of the relationship between the inputs and output of the LUT 363. By way of example, a pixel for which G, B<TH2 and R>TH3 and |G−B|<TH4 holds is judged to be a R (red) pixel, and a pixel for which

G<TH2 and R, B>TH3 and |R−B|<TH4 holds is judged to be a M (magenta) pixel. The LUT 363 outputs the results of detection as R, G, B data of one bit each, by way of example. Accordingly, the LUT 363 outputs "000" if a K (black) pixel is detected, "100" if a R (red) pixel is detected, "010" if a G (green) pixel is detected, "001" if a B (blue) pixel is detected, "011" if a Y (yellow) pixel is detected, "101" if a M (magenta) pixel is detected, "110" if a C (cyan) pixel is detected and "111" (white) in case of a pixel that is not any of these colors.

When 50, 205, 30 are set as the above-mentioned threshold values TH2, TH3, TH4, respectively, excellent results of detection are obtained.

The color-character discriminating circuit 253 is now described.

Figure 15:
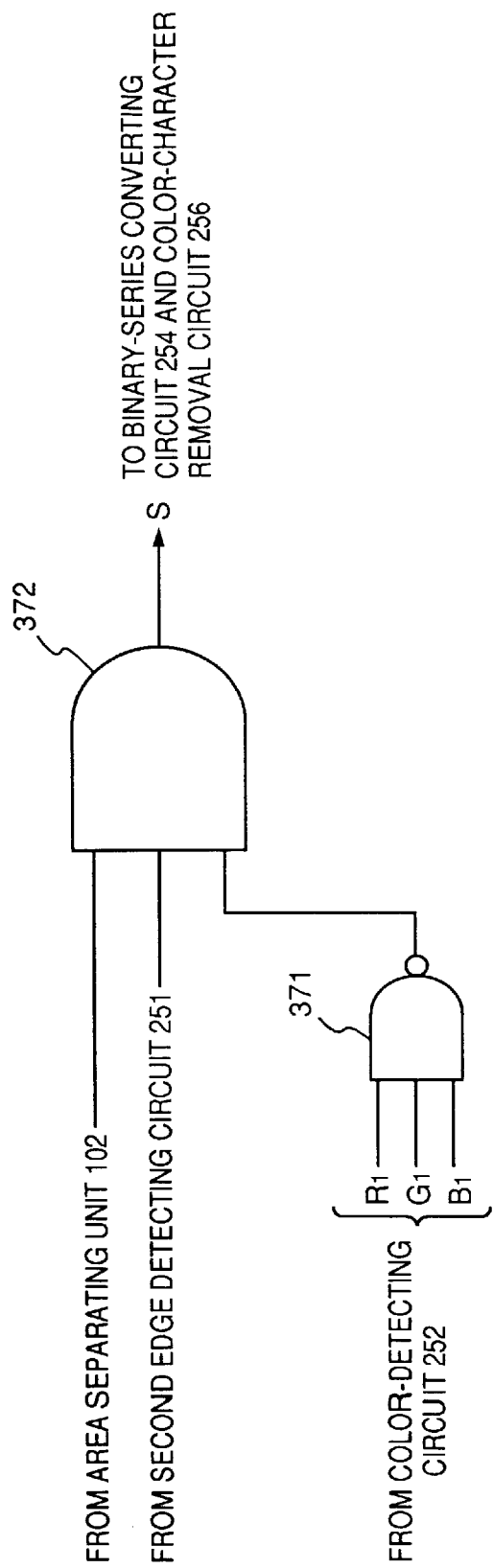
FIG. 15 is a block diagram illustrating the construction of the color-character discriminating circuit 253 shown in FIG. 10.

FIG. 15 is a block diagram illustrating the construction of the color-character discriminating circuit 253.

The color-character discriminating circuit 253 includes a NAND gate 371 for outputting the NAND of each bit of the RGB data received from the color detecting circuit 252, and an AND gate 372 for taking the AND of the results of area separation from the area separating unit 102, the results of edge detection from the second edge detecting circuit 251 and the data from the NAND gate 371, and providing the result of the AND operation as discrimination data S.

Thus, the color-character discriminating circuit 253 judges that a color-character pixel is a pixel in a block in which a pixel corresponding to an edge is judged to exist by the second edge detecting circuit in an area judged to be a character area by the area separating unit 102, this pixel also being judged to be any of the K, R, G, B, C, M, Y pixels by the color detecting circuit 252. The circuit 253 outputs the discrimination data S="1" in response to discrimination of this color-character pixel.

The binary-series converting circuit 254 is described next.

Figure 16:
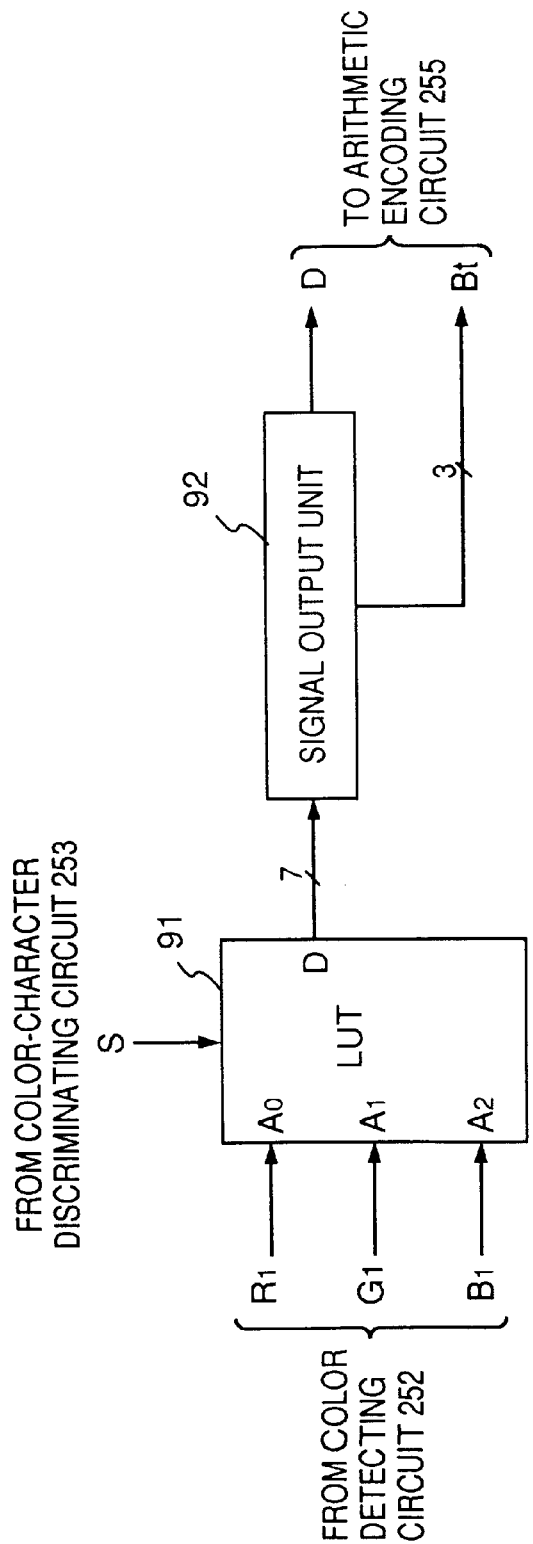
FIG. 16 is a block diagram illustrating the construction of the binary-series converting circuit 254 shown in FIG. 10.

FIG. 16 is a block diagram illustrating the construction of the binary-series converting circuit 254.

The converting circuit 254 includes a LUT 91 constituted by a ROM, for example. If the discrimination data received from the color-character discriminating circuit 253 is "1", the LUT 91 outputs binary-series data of 1~7 bits, an example of which is illustrated in FIG. 17, corresponding to the R, G, B data of one bit each provided to address terminals A from the color detecting circuit 252. The binary-series data is output from a data terminal D.

The binary-series converting circuit 254 further includes a signal output unit 92 to which the binary-series data of 1~7 bits from the LUT 91 is applied. The signal output unit 92 outputs the binary-series data, as a binary-series output signal D, one bit at a time in serial form starting from the most significant bit (hereinafter referred to as the "MSB"). If the signal output unit 92 outputs "1" or seven "0"s, the output of one pixel is terminated and the next input data is received. Further, the signal output unit 92 also outputs three-bit signal Bt, for example, for indicating which bit of the binary-series data is currently being outputted.

Thus, according to this embodiment, the R, G, B data each of one bit outputted by the color detecting circuit 252 is converted into a serial binary signal in dependence upon the result of discrimination performed by the color-character discriminating circuit 253, after which this binary-series signal is encoded by the arithmetic encoding circuit 255. As a result, not only is each bit of the mutually correlated R, G, B data individually encoded but this encoding is performed while preserving the hue correlation. Moreover, in a case where encoding is performed while predicting the value of a pixel of interest, as in arithmetic encoding, prediction and encoding are not performed for every color component of RGB. Rather, prediction and encoding is carried out using color information. This makes it possible to improve encoding efficiency.

Each color component of RGB representing the color of each pixel is represented by one item of data. Therefore, when decoding is performed, the RGB data of one pixel is obtained at one time by decoding one item of data. This makes it possible to rapidly reproduce a color image.

The color-character removal circuit 256 is now described.

Figure 18:
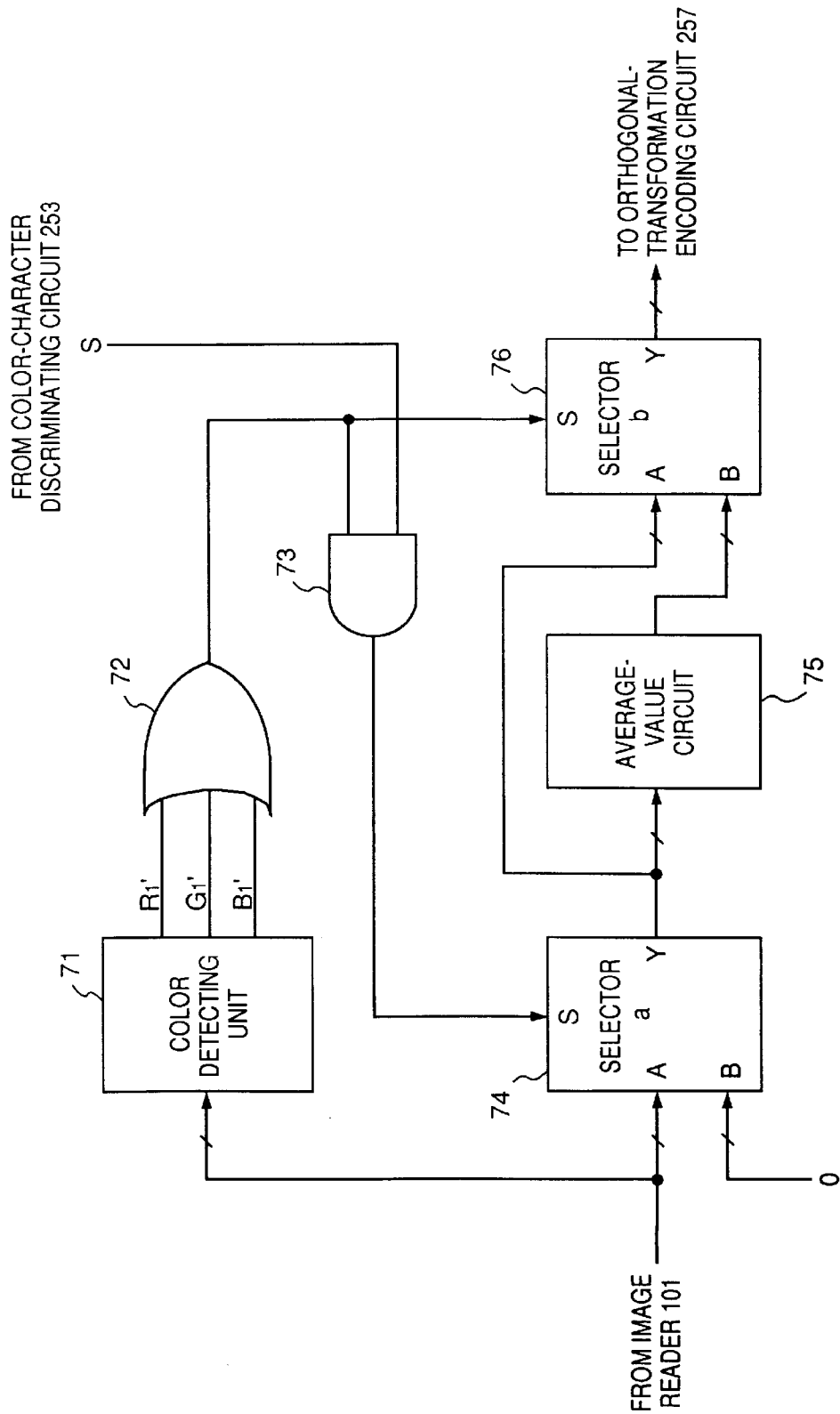
FIG. 18 is a block diagram illustrating the construction of the color-character removal circuit 256 shown in FIG. 10.

FIG. 18 is a block diagram illustrating the construction of the color-character removal circuit 256.

As shown in FIG. 18, the color-character removal circuit 256 includes a color detector 71, which has a construction substantially the same as that of the color detecting circuit 252, for detecting a color pixel and its peripheral pixels from the entered RGB data. Accordingly, the threshold values TH2, TH3, TH4 of the comparator circuits differ from those of the color detecting circuit 252, e.g., these values are set to 120, 130, 30, respectively, which are values that allow detection over a broader range.

An OR gate 72 outputs the OR of the one-bit R, G, B items of data received from the color detector 71, and an AND gate 73 outputs the AND of the output of the OR gate 72 and the discrimination data S received from the color-character discriminating circuit 253.

A selector (a) 74 outputs the data that has been applied to either a terminal A or a terminal B, depending upon a selection signal applied to a selection terminal S from the AND gate 73. It should be noted that the selector (a) 74 outputs the pixel data from the image reader 101 if the selection signal is "0" and outputs data (0) if the selection signal is "1".

An average value circuit 75 outputs the average value of pixels in, for example, an 8×8 pixel block from the RGB data received from the selector (a) 74. It should be noted that the pixel block size that determines the pixel average value is made the same as the encoding block size of the orthogonal-transformation encoding circuit 257, which is the next stage.

A selector (b) 76 outputs the data that has been applied to either a terminal A or a terminal B, depending upon a selection signal applied to a selection terminal S from the OR gate 72. It should be noted that the selector (b) 76 outputs the pixel data from the selector (a) 74 if the selection signal is "0" and the pixel average value from the average-value circuit 75 if the selection signal is "1".

FIGS. 19A~19D are diagrams for describing an example of the operation of the color-character removal circuit 256.

Figure 19A:
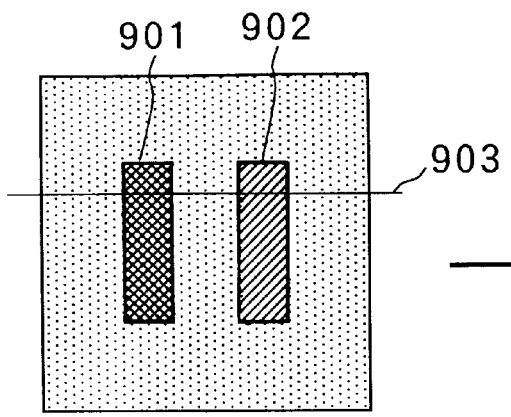
FIGS. 19A, 19B, 19C and 19D are diagrams for describing the operation of the color-character removal circuit 256 shown in FIG. 18.
Figure 19B:
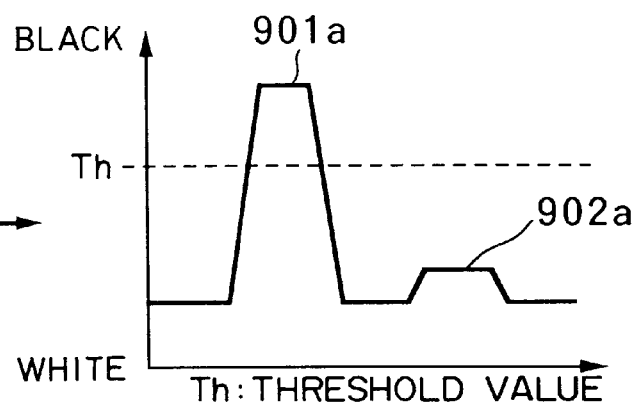

FIG. 19B shows an example of the image data that enters the selector (a) 74. This illustrates a change in black level in a case where the image depicted in FIG. 19A is read at line 903.

Figure 19C:
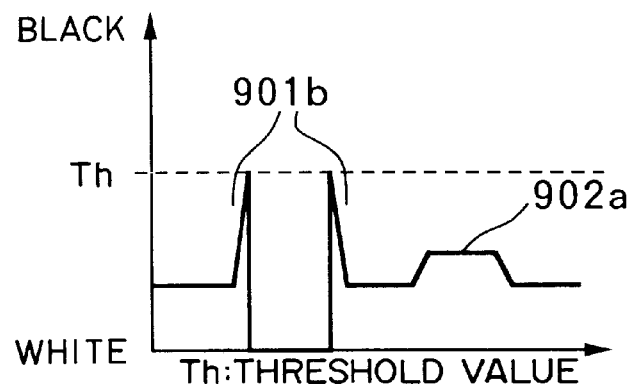
Figure 19D:
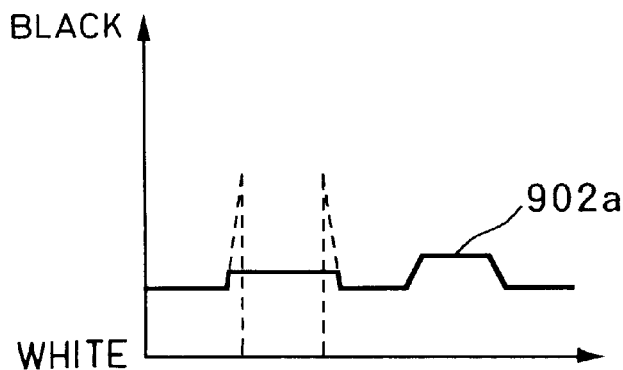

As set forth above, the output of the OR gate 72 is "1" if the pixel data exceeds the threshold value shown in FIG. 19B. If the discrimination data S from the color-character discriminating circuit 253 is "1" at the same time, then the output of the AND gate 73 also becomes "1". Accordingly, the image data outputted by the selector (a) 74 has data 901a corresponding to an image 901 removed from it, whereby the result shown in FIG. 19C is obtained. Furthermore, the image data outputted by the selector (b) 76 has the portion of the remaining data 901b of image 901 averaged, whereby the result shown in FIG. 19D is obtained.

In the foregoing description, an example in which a color-character pixel is replaced by an average value of pixels in, for example, an 8×8 pixel block is described.

However, this does not impose a limitation upon the embodiment. An arrangement can be adopted in which the color-character pixel is replaced by the value that appears most frequently in the block or by the central value of the same block, which is obtained by a median filter.

The orthogonal-transformation encoding circuit 257 is described next.

Figure 20:
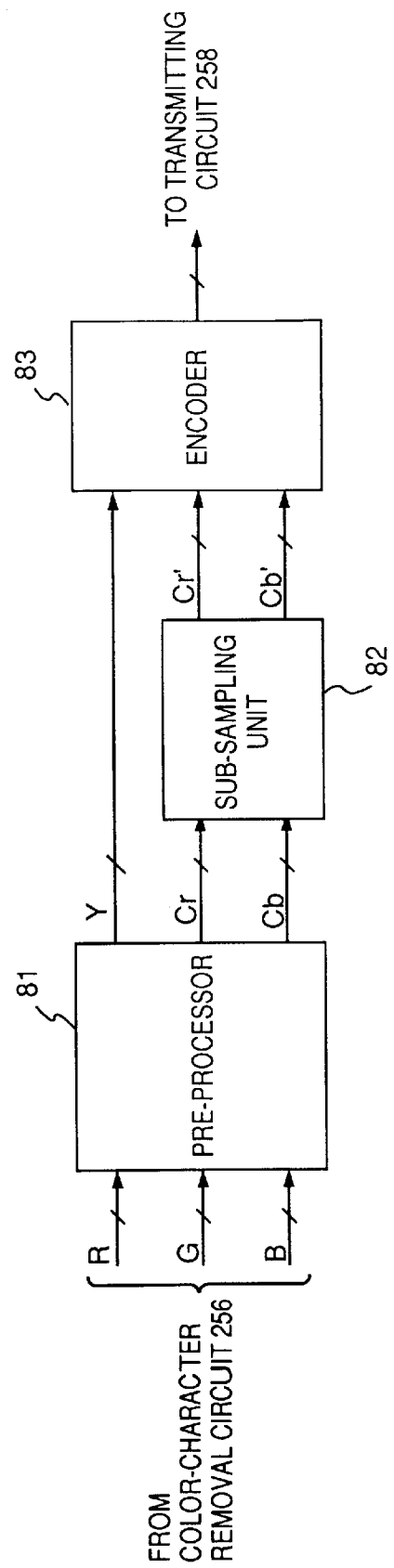
FIG. 20 is a block diagram showing the construction of the orthogonal-transformation encoding circuit 257 shown in FIG. 10.

FIG. 20 is a block diagram illustrating the construction of the orthogonal-transformation encoding circuit 257.

As shown in FIG. 20, the encoding circuit 257 includes a pre-processor 81 for converting the RGB data from the color-character removal circuit 256 into a luminance signal Y and color-difference signals Cr, Cb, and a sampling unit 82 for outputting average values Cr', Cb' of, for example, every 2×2 pixel block of the signals Cr, Cb received from the pre-processor 81. This makes use of the fact that the nature of the sense of sight is such that a deterioration in the color difference signals Cr, Cb is more difficult to ascertain in comparison with that of the luminance signal Y.

The encoding circuit 257 further includes an encoder 83 which, in accordance with an adaptive discrete cosine transformation (ADCT), encodes the luminance signal Y received from the pre-processor 81 and the color-difference signals Cr', Cb' received from the sampling unit 82.

[Decoder 104]

Figure 21:
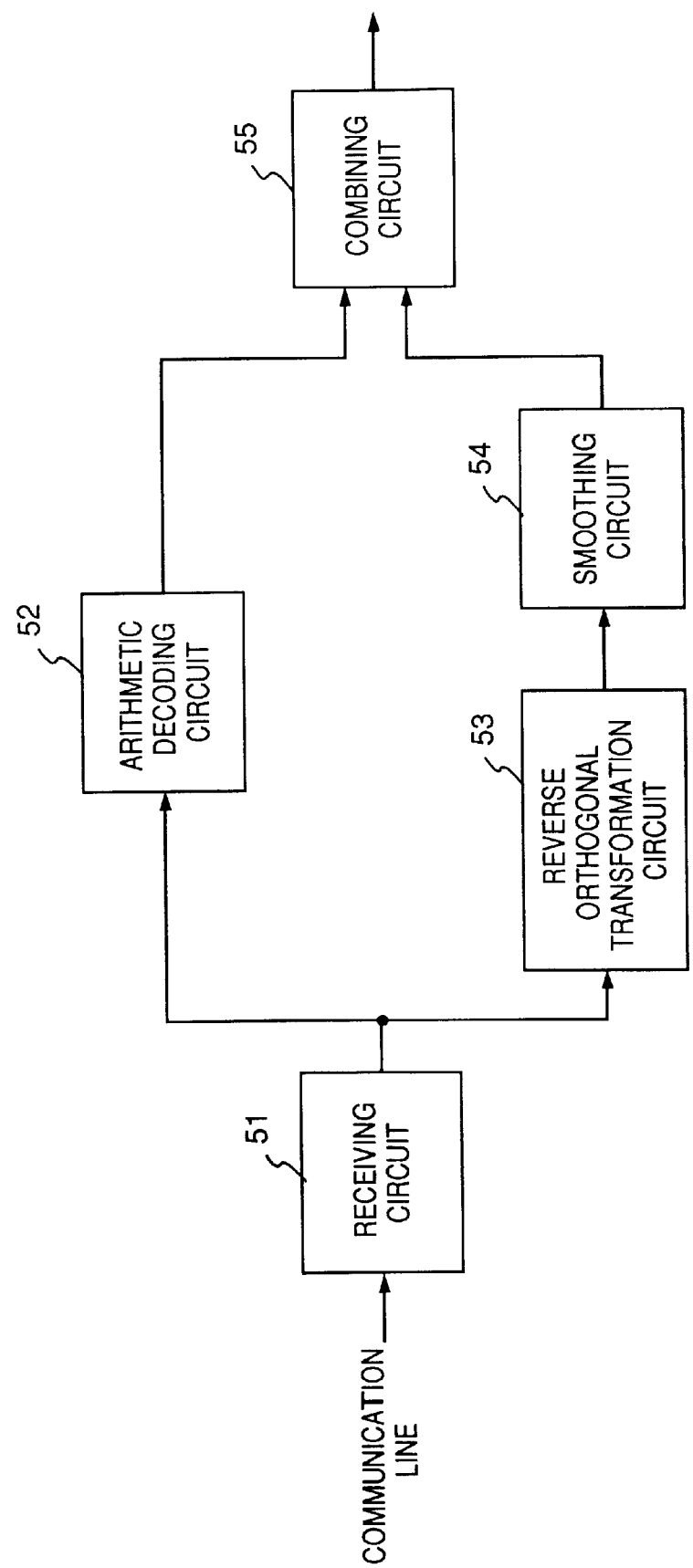
FIG. 21 is a block diagram illustrating the construction of the decoder 104 shown in FIG. 9.

FIG. 21 is a block diagram illustrating the construction of the decoder 104.

As shown in FIG. 21, the decoder 104 includes a receiving circuit 51 which, upon receiving a code from a communication line, etc., separates the code into an arithmetic code and a Huffman code by a flag.

An arithmetic decoding circuit 52 decodes the arithmetic code, received from the receiving circuit 51, through a procedure which is the reverse of that of the arithmetic encoding circuit 255, and outputs color-character data. A reverse orthogonal transformation circuit 53 first decodes the Huffman code through a procedure which is the reverse of that of the orthogonal-transformation encoding circuit 257, and then applies reverse orthogonal transformation processing to the decoded result, thereby outputting image data. A smoothing circuit 54 smoothes block distortion of the image data received from the reverse orthogonal transformation circuit 53. A combining circuit 55 combines the color-character data from the arithmetic decoding circuit 52 and the image data from the smoothing circuit 54 to reproduce the image data. It should be noted that the combining circuit 55 combines the result of multiplying the R, G, B values of color-character data by respective ones of prescribed coefficients, whereby priority is given to color-character data so that clear color characters is reproduced.

In this embodiment, the reason why smoothing is applied to the image data outputted by the reverse orthogonal transformation circuit 53 but not to the color-character data outputted by the arithmetic decoding circuit 52 is that this would cause a decline in the resolution of the character In accordance with the present invention as described above, effects similar to those of the first embodiment are obtained. Moreover, the accuracy at which color characters are detected is improved by detecting color-character portions in character areas.

Further, in accordance with this embodiment, separated color-character data is arithmetically encoded, a portion of data from which a color character has been separated and removed is replaced by an average value of the surrounding peripheral pixels and the image data from which the color-character data has been removed is encoded by orthogonal transformation. As a result, efficient encoding of image data is realized without causing a decline in picture quality.

Figure 22:
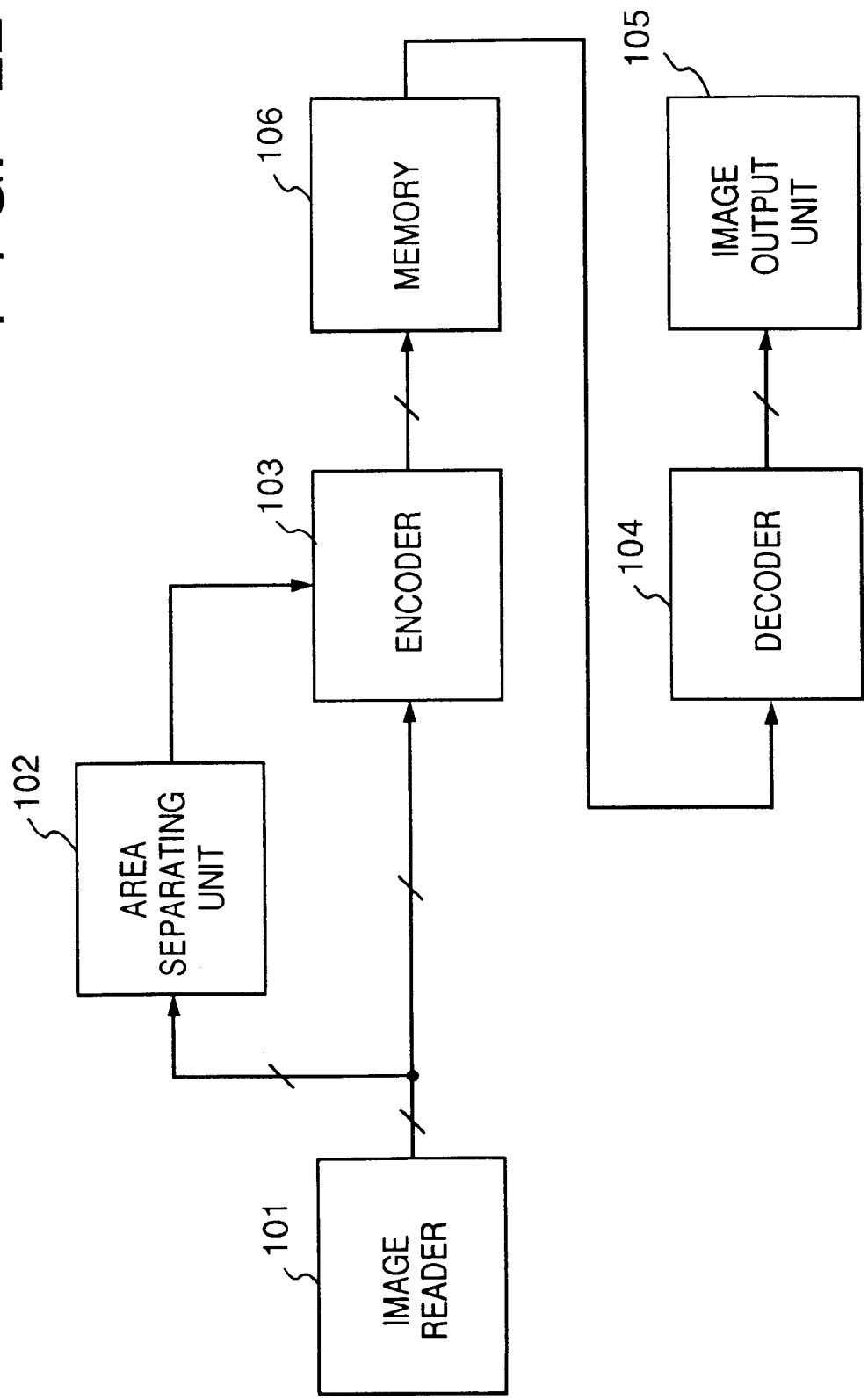
FIG. 22 is a block diagram illustrating the construction of an image memory apparatus according to another embodiment of the present invention.

The present embodiment is not limited to an image communication apparatus such as a color facsimile. For example, as illustrated in FIG. 22, a memory 106 may be provided instead of a communication line so that the invention can also be applied to an image storage apparatus such as an image filing apparatus. It should be noted that the memory 106 may be a hard disk, a semiconductor memory or an optomagnetic disk and is capable of storing a number of images. An arrangement may be adopted in which arithmetic codes of color-character data and Huffman codes of image data are stored individually or stored collectively image by image.

Furthermore, in the image memory apparatus of FIG. 22, it is possible to reproduce only color characters or only images other than characters, by way of example.

The present invention can be applied to a system, such as a reader or printer system, constituted by a plurality of devices or to an apparatus comprising a single device. Furthermore, it goes without saying that the invention is also applicable to a case where the object of the invention is attained by supplying a program to a system or apparatus.

Thus, in accordance with the present invention, it is possible to provide an image processing method and apparatus for extracting edge information in image data from at least one of a plurality of items of band-limited image data produced from the image data, and detecting character areas in the image data based upon the distribution of the edge information.

Further, in accordance with the present invention, it is possible to provide an image processing apparatus for extracting edge information in image data from at least one of a plurality of items of band-limited image data produced from the image data, detecting character areas in the image data based upon the distribution of the edge information, separating the image data into character data and non-character data based upon the character-area information detected and encoding the separated character data and non-character data.

It should be noted that the above-mentioned band limited image data can be realized not only by a wavelet transformation but also by other methods such as a window Fourier transform.

Further, though image discrimination may be performed in either block units or pixel units, better information is obtained using pixel units.

In addition, the manner in which bands are obtained is not limited to that of the foregoing embodiments. Furthermore, the characteristics of an image are not limited to whether or not the image is a character. For example, such characteristics may depend on whether or not an image is a dot image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for entering first image data;

conversion means for converting the first image data into a plurality of band-limited second image data by sequentially performing a plurality of spatial filtering processes on the first image data; and discriminating means for discriminating a characteristic of an image, which is represented by the first image data, on the basis of at least one of the plurality of band-limited second image data;

wherein said discriminating means selects the band-limited second image data for use in the discrimination from the plurality of band-limited second image data, each of which is Produced by performing different types of spatial filtering processes, or which are produced by performing a spatial filtering process a predetermined number of times.

2. The apparatus according to claim 1, wherein said conversion means performs a two-dimensional wavelet transformation.

3. The apparatus according to claim 1, wherein said conversion means comprises a low-pass filter and a high-pass filter.

4. The apparatus according to claim 1, wherein said band-limited second image data represents an edge component.

5. The apparatus according to claim 4, wherein said discrimination means discriminates an image characteristic using said edge component.

6. The apparatus according to claim 1, further comprising correcting means for correcting results of said discrimination.

7. The apparatus according to claim 1, further comprising encoding means for encoding the first image data, which has been entered by said input means, in conformity with results of said discrimination.

8. The apparatus according to claim 7, wherein said encoding means has a first encoding circuit for encoding a character area and a second encoding circuit for encoding other areas.

9. The apparatus according to claim 8, wherein said first encoding circuit performs entropy encoding and said second encoding circuit performs information non-preserving coding.

10. An image processing method comprising the steps of:

entering first image data;

converting the first image data into a plurality of band-limited second image data by sequentially performing a plurality of spatial filtering processes on the first image data; and discriminating a characteristic of an image, which is represented by the first image data, on the basis of at least one of the plurality of band-limited second image data;

wherein the band-limited second image data for use in the discrimination is selected from the plurality of band-limited second image data, each of which is produced by performing different types of spatial filtering processes, or which are produced by performing a spatial filtering process a predetermined number of times.

* * * * *

UNITED STATES PATENT AND TRADEMARK OFFICE
CERTIFICATE OF CORRECTION

PATENT NO. : 5,905,579

DATED : May 18, 1999

INVENTOR(S) : AKIHIRO KATAYAMA ET AL.

It is certified that error appears in the above-identified patent and that said Letters Patent is hereby corrected as shown below:

ON TITLE PAGE

[76] Inventors:
    "Akihiro Katayama; Yoshihiro Ishida, both of c/o Canon Kabushiki Kaisha, 30-2, Shimomaruko 3-chome, Ohta-ku, Tokyo, Japan" should read
    --Akihiro Katayama; Yoshihiro Ishida, both of Kawasaki, Japan--.

COLUMN 3 line 19, "embodiment" should read --embodiment.--.

COLUMN 6 line 53, "examples" should read --example,--.

UNITED STATES PATENT AND TRADEMARK OFFICE
CERTIFICATE OF CORRECTION

PATENT NO. : 5,905,579

DATED : May 18, 1999

INVENTOR(S) : AKIHIRO KATAYAMA ET AL.

It is certified that error appears in the above-identified patent and that said Letters Patent is hereby corrected as shown below:

COLUMN 7 line 40, "S11" should read --S11.--; and
  line 54, "to jumps" should read --jumps--.

COLUMN 12 line 29, "is" should read --are--.

COLUMN 14 line 9, "is" should read --are--; and
  line 14, "character" should read --character.--.

UNITED STATES PATENT AND TRADEMARK OFFICE
CERTIFICATE OF CORRECTION

PATENT NO. : 5,905,579

DATED : May 18, 1999

INVENTOR(S) : AKIHIRO KATAYAMA ET AL.

It is certified that error appears in the above-identified patent and that said Letters Patent is hereby corrected as shown below:

COLUMN 15 line 28, "Produced" should read --produced--.

Signed and Sealed this

Third Day of October, 2000

Attest:

Q. TODD DICKINSON

*Attesting Officer*     *Director of Patents and Trademarks*